US011387729B2

(12) United States Patent
Marcinkiewicz

(10) Patent No.: US 11,387,729 B2
(45) Date of Patent: Jul. 12, 2022

(54) BUCK-CONVERTER-BASED DRIVE CIRCUITS FOR DRIVING MOTORS OF COMPRESSORS AND CONDENSER FANS

(71) Applicant: Emerson Climate Technologies, Inc., Sidney, OH (US)

(72) Inventor: Joseph G. Marcinkiewicz, St. Peters, MO (US)

(73) Assignee: Emerson Climate Technologies, Inc., Sidney, OH (US)

( * ) Notice: Subject to any disclaimer, the term of this patent is extended or adjusted under 35 U.S.C. 154(b) by 395 days.

(21) Appl. No.: 15/487,226

(22) Filed: Apr. 13, 2017

(65) Prior Publication Data

US 2017/0302200 A1   Oct. 19, 2017

Related U.S. Application Data

(60) Provisional application No. 62/398,641, filed on Sep. 23, 2016, provisional application No. 62/398,658, (Continued)

(51) Int. Cl.
*B60H 1/32* (2006.01)
*H02M 1/42* (2007.01)
(Continued)

(52) U.S. Cl.
CPC ............ *H02M 1/42* (2013.01); *F25B 49/025* (2013.01); *H02M 1/08* (2013.01); *H02M 1/14* (2013.01);
(Continued)

(58) Field of Classification Search
None
See application file for complete search history.

(56) References Cited

U.S. PATENT DOCUMENTS 3,723,961 A    3/1973 McNaney
4,388,578 A    6/1983 Green et al.
(Continued)

FOREIGN PATENT DOCUMENTS

CN         1051787 A    5/1991
CN       101459993 A    6/2009
(Continued)

OTHER PUBLICATIONS

International Search Report regarding International Application No. PCT/US2017/027691, dated Aug. 18, 2017.
(Continued)

*Primary Examiner* — Muhammad S Islam
*Assistant Examiner* — Zemenay T Truneh
(74) *Attorney, Agent, or Firm* — Harness, Dickey & Pierce, P.L.C.

(57) ABSTRACT

A drive circuit is provided and includes a rectification circuit, a buck converter, a first inverter, and a second inverter. The rectification circuit is configured to rectify a first AC voltage signal to generate a rectified voltage signal. The buck converter is configured to downconvert the rectified voltage signal to a DC voltage signal, wherein the DC voltage signal is supplied to a DC bus. The first inverter is configured to convert the DC voltage signal to a second AC voltage signal and supply the second AC voltage signal to a compressor motor. The second inverter is configured to convert the DC voltage signal to a third AC voltage signal and supply the third AC voltage signal to a condenser fan motor. Peak voltages of the second AC voltage signal and the third AC voltage signal are less than peak voltages of the first AC voltage signal.

16 Claims, 8 Drawing Sheets

Related U.S. Application Data filed on Sep. 23, 2016, provisional application No. 62/323,505, filed on Apr. 15, 2016, provisional application No. 62/323,607, filed on Apr. 15, 2016, provisional application No. 62/323,498, filed on Apr. 15, 2016.

(51) Int. Cl.

| | |
|---|---|
| *H02M 1/08* | (2006.01) |
| *H02M 1/14* | (2006.01) |
| *H02M 1/32* | (2007.01) |
| *H02M 1/44* | (2007.01) |
| *H02M 7/06* | (2006.01) |
| *F25B 49/02* | (2006.01) |
| *H02P 27/06* | (2006.01) |
| *H02M 5/458* | (2006.01) |
| *H02P 5/74* | (2006.01) |
| *H02M 7/5387* | (2007.01) |
| *H02M 1/00* | (2006.01) |

(52) U.S. Cl.
CPC ........... *H02M 1/32* (2013.01); *H02M 1/4225* (2013.01); *H02M 1/44* (2013.01); *H02M 5/458* (2013.01); *H02M 7/06* (2013.01); *H02P 5/74* (2013.01); *H02P 27/06* (2013.01); *F25B 2600/021* (2013.01); *F25B 2600/024* (2013.01); *F25B 2600/111* (2013.01); *F25B 2700/151* (2013.01); *H02M 1/008* (2021.05); *H02M 1/0009* (2021.05); *H02M 1/0032* (2021.05); *H02M 1/327* (2021.05); *H02M 1/4208* (2013.01); *H02M 1/4216* (2013.01); *H02M 1/4291* (2021.05); *H02M 7/53871* (2013.01); *Y02B 30/70* (2013.01); *Y02B 70/10* (2013.01)

(56) References Cited

U.S. PATENT DOCUMENTS

| | | | |
|---|---|---|---|
| 4,437,146 A | 3/1984 | Carpenter | |
| 4,504,922 A | 3/1985 | Johnson et al. | |
| 4,939,473 A | 7/1990 | Eno | |
| 5,367,617 A | 11/1994 | Goossen et al. | |
| 5,410,360 A | 4/1995 | Montgomery | |
| 5,493,101 A | 2/1996 | Innes | |
| 5,506,484 A | 4/1996 | Munro et al. | |
| 5,583,420 A | 12/1996 | Rice et al. | |
| 5,594,635 A | 1/1997 | Gegner | |
| 5,600,233 A | 2/1997 | Warren et al. | |
| 5,754,036 A | 5/1998 | Walker | |
| 5,801,516 A | 9/1998 | Rice et al. | |
| 5,823,004 A | 10/1998 | Polley et al. | |
| 5,903,130 A | 5/1999 | Rice et al. | |
| 6,018,200 A | 1/2000 | Anderson et al. | |
| 6,031,749 A | 2/2000 | Covington et al. | |
| 6,115,051 A | 9/2000 | Simons et al. | |
| 6,137,253 A | 10/2000 | Galbiati et al. | |
| 6,158,887 A | 12/2000 | Simpson | |
| 6,169,670 B1 | 1/2001 | Okubo et al. | |
| 6,181,587 B1 | 1/2001 | Kuramoto et al. | |
| 6,188,203 B1 | 2/2001 | Rice et al. | |
| 6,215,287 B1 | 4/2001 | Matsushiro et al. | |
| 6,239,523 B1 | 5/2001 | Janicek et al. | |
| 6,249,104 B1 | 6/2001 | Janicek | |
| 6,281,658 B1 | 8/2001 | Han et al. | |
| 6,282,910 B1 | 9/2001 | Helt | |
| 6,295,215 B1 | 9/2001 | Faria et al. | |
| 6,307,759 B1 | 10/2001 | Inarida et al. | |
| 6,309,385 B1 | 10/2001 | Simpson | |
| 6,313,602 B1 | 11/2001 | Arefeen et al. | |
| 6,384,579 B2 | 5/2002 | Watanabe | |
| 6,433,504 B1 | 8/2002 | Branecky | |
| 6,437,997 B1 | 8/2002 | Inarida et al. | |
| 6,476,663 B1 | 11/2002 | Gauthier et al. | |
| 6,483,265 B1 | 11/2002 | Hollenbeck et al. | |
| 6,498,451 B1 | 12/2002 | Boules et al. | |
| 6,515,437 B1 | 2/2003 | Zinkler et al. | |
| 6,556,462 B1 | 4/2003 | Steigerwald et al. | |
| 6,586,904 B2 | 7/2003 | McClelland et al. | |
| 6,593,881 B2 | 7/2003 | Vail et al. | |
| 6,629,776 B2 | 10/2003 | Bell et al. | |
| 6,693,407 B2 | 2/2004 | Atmur | |
| 6,693,409 B2 | 2/2004 | Lynch et al. | |
| 6,710,573 B2 | 3/2004 | Kadah | |
| 6,717,457 B2 | 4/2004 | Nanba et al. | |
| 6,737,833 B2 | 5/2004 | Kalman et al. | |
| 6,781,802 B2 | 8/2004 | Kato et al. | |
| 6,801,028 B2 | 10/2004 | Kernahan et al. | |
| 6,806,676 B2 | 10/2004 | Papiernik et al. | |
| 6,810,292 B1 | 10/2004 | Rappenecker et al. | |
| 6,859,008 B1 | 2/2005 | Seibel | |
| 6,885,161 B2 | 4/2005 | de Nanclares et al. | |
| 6,885,568 B2 | 4/2005 | Kernahan et al. | |
| 6,900,607 B2 | 5/2005 | Kleinau et al. | |
| 6,902,117 B1 | 6/2005 | Rosen | |
| 6,906,500 B2 | 6/2005 | Kernahan | |
| 6,906,933 B2 | 6/2005 | Taimela | |
| 6,909,266 B2 | 6/2005 | Kernahan et al. | |
| 6,930,459 B2 | 8/2005 | Fritsch et al. | |
| 6,949,915 B2 | 9/2005 | Stanley | |
| 6,952,089 B2 | 10/2005 | Matsuo | |
| 6,961,015 B2 | 11/2005 | Kernahan et al. | |
| 6,979,967 B2 | 12/2005 | Ho | |
| 6,979,987 B2 | 12/2005 | Kernahan et al. | |
| 6,984,948 B2 | 1/2006 | Nakata et al. | |
| 7,015,679 B2 | 3/2006 | Ryba et al. | |
| 7,053,569 B2 | 5/2006 | Takahashi et al. | |
| 7,061,195 B2 | 6/2006 | Ho et al. | |
| 7,068,016 B2 | 6/2006 | Athari | |
| 7,068,191 B2 | 6/2006 | Kuner et al. | |
| 7,071,641 B2 | 7/2006 | Arai et al. | |
| 7,081,733 B2 | 7/2006 | Han et al. | |
| 7,112,940 B2 | 9/2006 | Shimozono et al. | |
| 7,135,830 B2 | 11/2006 | El-Ibiary | |
| 7,148,664 B2 | 12/2006 | Takahashi et al. | |
| 7,149,644 B2 | 12/2006 | Kobayashi et al. | |
| 7,154,238 B2 | 12/2006 | Kinukawa et al. | |
| 7,164,590 B2 | 1/2007 | Li et al. | |
| 7,176,644 B2 | 2/2007 | Ueda et al. | |
| 7,180,273 B2 | 2/2007 | Bocchiola et al. | |
| 7,181,923 B2 | 2/2007 | Kurita et al. | |
| 7,193,383 B2 | 3/2007 | Sarlioglu et al. | |
| 7,202,626 B2 | 4/2007 | Jadric et al. | |
| 7,208,891 B2 | 4/2007 | Jadric et al. | |
| 7,221,121 B2 | 5/2007 | Skaug et al. | |
| 7,239,257 B1 | 7/2007 | Alexander et al. | |
| 7,256,564 B2 | 8/2007 | MacKay | |
| 7,274,241 B2 | 9/2007 | Ho et al. | |
| 7,309,977 B2 | 12/2007 | Gray et al. | |
| 7,330,011 B2 | 2/2008 | Ueda et al. | |
| 7,336,514 B2 | 2/2008 | Amarillas et al. | |
| 7,339,346 B2 | 3/2008 | Ta et al. | |
| 7,358,706 B2 | 4/2008 | Lys | |
| 7,359,224 B2 | 4/2008 | Li | |
| 7,425,806 B2 | 9/2008 | Schnetzka et al. | |
| 7,459,864 B2 | 12/2008 | Lys | |
| 7,463,006 B2 | 12/2008 | Ta et al. | |
| 7,495,404 B2 | 2/2009 | Sarlioglu et al. | |
| 7,508,688 B2 | 3/2009 | Virolainen | |
| 7,532,491 B2 | 5/2009 | Lim et al. | |
| 7,573,275 B2 | 8/2009 | Inagaki et al. | |
| 7,592,820 B2 | 9/2009 | Laakso et al. | |
| 7,598,698 B2 | 10/2009 | Hashimoto et al. | |
| 7,612,522 B2 | 11/2009 | Williams et al. | |
| 7,613,018 B2 | 11/2009 | Lim et al. | |
| 7,616,466 B2 | 11/2009 | Chakrabarti et al. | |
| 7,633,249 B2 | 12/2009 | Sekimoto et al. | |
| 7,650,760 B2 | 1/2010 | Nakata et al. | |
| 7,659,678 B2 | 2/2010 | Maiocchi | |
| 7,667,986 B2 | 2/2010 | Artusi et al. | |
| 7,671,557 B2 | 3/2010 | Maeda et al. | |

(56) References Cited

U.S. PATENT DOCUMENTS

| | | |
|---|---|---|
| 7,675,759 B2 | 3/2010 | Artusi et al. |
| 7,723,964 B2 | 5/2010 | Taguchi |
| 7,750,595 B2 | 7/2010 | Yamada et al. |
| 7,771,115 B2 | 8/2010 | Pan |
| 7,847,507 B2 | 12/2010 | Wagoner |
| 7,880,430 B2 | 2/2011 | Gale et al. |
| 7,888,922 B2 | 2/2011 | Melanson |
| 7,903,441 B2 | 3/2011 | Chen et al. |
| 7,952,293 B2 | 5/2011 | Kelly |
| 7,966,079 B2 | 6/2011 | Graves |
| 7,966,081 B2 | 6/2011 | Graves |
| 8,032,323 B2 | 10/2011 | Taylor |
| 8,040,703 B2 | 10/2011 | Melanson |
| 8,044,623 B2 | 10/2011 | Takeuchi et al. |
| 8,050,063 B2 | 11/2011 | Wagoner et al. |
| 8,054,033 B2 | 11/2011 | Kern et al. |
| 8,065,023 B2 | 11/2011 | Graves |
| 8,072,170 B2 | 12/2011 | Hwang et al. |
| 8,092,084 B2 | 1/2012 | Riddle et al. |
| 8,096,139 B2 | 1/2012 | Taras et al. |
| 8,120,299 B2 | 2/2012 | Hwang et al. |
| 8,130,522 B2 | 3/2012 | Maksimovic |
| 8,154,230 B2 | 4/2012 | Kimura |
| 8,164,292 B2 | 4/2012 | Park |
| 8,169,180 B2 | 5/2012 | Hwang et al. |
| 8,174,853 B2 | 5/2012 | Kane et al. |
| 8,182,245 B2 | 5/2012 | Maeda et al. |
| 8,193,756 B2 | 6/2012 | Jadric et al. |
| 8,223,508 B2 | 7/2012 | Baarman et al. |
| 8,228,700 B2 | 7/2012 | Yahata et al. |
| 8,258,731 B2 | 9/2012 | Shimizu |
| 8,264,192 B2 | 9/2012 | Green et al. |
| 8,264,860 B2 | 9/2012 | Green |
| 8,269,370 B2 | 9/2012 | Haga |
| 8,278,778 B2 | 10/2012 | Rockenfeller et al. |
| 8,288,985 B2 | 10/2012 | Takahashi |
| 8,292,503 B2 | 10/2012 | Pan |
| 8,299,653 B2 | 10/2012 | Rockenfeller et al. |
| 8,305,780 B2 | 11/2012 | Saruwatari et al. |
| 8,320,145 B2 | 11/2012 | Horii |
| 8,321,039 B2 | 11/2012 | Graves |
| 8,335,095 B2 | 12/2012 | Mi et al. |
| 8,344,638 B2 | 1/2013 | Shteynberg et al. |
| 8,345,454 B1 | 1/2013 | Krolak et al. |
| 8,358,098 B2 | 1/2013 | Skinner et al. |
| 8,395,874 B2 | 3/2013 | Yamai et al. |
| 8,400,089 B2 | 3/2013 | Bonner et al. |
| 8,406,021 B2 | 3/2013 | Green |
| 8,432,108 B2 | 4/2013 | Kelly et al. |
| 8,432,713 B2 | 4/2013 | Popescu et al. |
| 8,467,197 B2 | 6/2013 | Perisic et al. |
| 8,477,514 B2 | 7/2013 | Artusi et al. |
| 8,477,517 B2 | 7/2013 | Joshi |
| 8,487,601 B2 | 7/2013 | Saint-Pierre |
| 8,493,014 B2 | 7/2013 | Henderson et al. |
| 8,508,165 B2 | 8/2013 | Shinomoto et al. |
| 8,508,166 B2 | 8/2013 | Marcinkiewicz et al. |
| 8,520,415 B1 | 8/2013 | Krishnamoorthy et al. |
| 8,520,420 B2 | 8/2013 | Jungreis et al. |
| 8,547,024 B2 | 10/2013 | Grotkowski et al. |
| 8,547,713 B2 | 10/2013 | Kono et al. |
| 8,564,982 B2 | 10/2013 | Song et al. |
| 8,582,263 B2 | 11/2013 | Butler |
| 8,587,962 B2 | 11/2013 | Perisic et al. |
| 8,599,577 B2 | 12/2013 | Kajouke et al. |
| 8,614,562 B2 | 12/2013 | Bouchez et al. |
| 8,633,668 B2 | 1/2014 | Marcoccia |
| 8,638,074 B2 | 1/2014 | Babcock et al. |
| 8,648,558 B2 | 2/2014 | Clothier et al. |
| 8,657,585 B2 | 2/2014 | Hong et al. |
| 8,669,805 B2 | 3/2014 | Serventi et al. |
| 8,693,228 B2 | 4/2014 | Matan et al. |
| 8,698,433 B2 | 4/2014 | Green |
| 8,704,409 B2 | 4/2014 | Owens |
| 8,736,207 B2 | 5/2014 | Ritter et al. |
| 8,749,222 B2 | 6/2014 | Williams |
| 8,751,374 B2 | 6/2014 | Graves |
| 8,760,089 B2 | 6/2014 | Smith |
| 8,760,096 B2 | 6/2014 | Inamura et al. |
| 8,767,418 B2 | 7/2014 | Jungreis et al. |
| 8,773,052 B2 | 7/2014 | Clothier et al. |
| 8,796,967 B2 | 8/2014 | Sato |
| 8,817,506 B2 | 8/2014 | Shimomugi et al. |
| 8,823,292 B2 | 9/2014 | Sumi et al. |
| 8,829,976 B2 | 9/2014 | Kuwabara et al. |
| 8,836,253 B2 | 9/2014 | Kato et al. |
| 8,847,503 B2 | 9/2014 | Chang et al. |
| 8,866,459 B2 | 10/2014 | Zilberberg |
| 8,884,560 B2 | 11/2014 | Ito |
| 8,896,248 B2 | 11/2014 | Becerra et al. |
| 8,928,262 B2 | 1/2015 | Chretien |
| 8,933,654 B2 | 1/2015 | Chen et al. |
| 8,937,821 B2 | 1/2015 | Amano et al. |
| 8,941,347 B2 | 1/2015 | Otorii et al. |
| 8,941,365 B2 | 1/2015 | Murdock et al. |
| 8,976,551 B2 | 3/2015 | Igarashi et al. |
| 9,020,731 B2 | 4/2015 | Yamada |
| 9,030,143 B2 | 5/2015 | Guzelgunler |
| 9,065,365 B2 | 6/2015 | Omata et al. |
| 9,065,367 B2 | 6/2015 | Greetham |
| 9,070,224 B1 | 6/2015 | Esfahbod MirHosseinZadeh Sarabi et al. |
| 9,071,186 B2 | 6/2015 | Wu et al. |
| 9,088,232 B2 | 7/2015 | Marcinkiewicz et al. |
| 9,088,237 B2 | 7/2015 | Sanchez et al. |
| 9,093,941 B2 | 7/2015 | Lawrence et al. |
| 9,100,019 B2 | 8/2015 | Akiyama |
| 9,109,959 B2 | 8/2015 | Nieddu et al. |
| 9,118,260 B2 | 8/2015 | Gautier et al. |
| 9,124,095 B1 | 9/2015 | Barron et al. |
| 9,124,200 B2 | 9/2015 | Dai |
| 9,130,493 B2 | 9/2015 | Chen et al. |
| 9,134,183 B2 | 9/2015 | Jeong et al. |
| 9,136,757 B2 | 9/2015 | Arisawa et al. |
| 9,136,790 B2 | 9/2015 | Park et al. |
| 9,185,768 B2 | 11/2015 | Navabi-Shirazi et al. |
| 9,188,491 B2 | 11/2015 | Pan |
| 9,190,926 B2 | 11/2015 | Taguchi |
| 9,197,132 B2 | 11/2015 | Artusi et al. |
| 9,214,881 B2 | 12/2015 | Sekimoto et al. |
| 9,225,258 B2 | 12/2015 | Shimomugi et al. |
| 9,225,284 B2 | 12/2015 | Ried |
| 9,240,739 B2 | 1/2016 | Fukuta et al. |
| 9,240,749 B2 | 1/2016 | Green et al. |
| 9,246,398 B2 | 1/2016 | Sakakibara et al. |
| 9,246,418 B2 | 1/2016 | Becker et al. |
| 9,247,608 B2 | 1/2016 | Chitta et al. |
| 9,250,299 B1 | 2/2016 | Yarlagadda et al. |
| 9,257,931 B2 | 2/2016 | Tooyama et al. |
| 9,300,241 B2 | 3/2016 | Becerra et al. |
| 9,312,780 B2 | 4/2016 | Taguchi |
| 9,322,717 B1 | 4/2016 | Dhaliwal et al. |
| 9,322,867 B2 | 4/2016 | Chatroux et al. |
| 9,325,517 B2 | 4/2016 | Grohman |
| 9,331,598 B2 | 5/2016 | Jeong et al. |
| 9,331,614 B2 | 5/2016 | Becerra et al. |
| 9,387,800 B2 | 7/2016 | Tran |
| 9,407,093 B2 | 8/2016 | Cummings |
| 9,407,135 B2 | 8/2016 | Kinomura et al. |
| 9,419,513 B2 | 8/2016 | Mao et al. |
| 9,425,610 B2 | 8/2016 | Nakashita et al. |
| 9,431,915 B2 | 8/2016 | Arisawa et al. |
| 9,431,923 B2 | 8/2016 | Harada et al. |
| 9,438,029 B2 | 9/2016 | Cameron |
| 9,444,331 B2 | 9/2016 | Carletti et al. |
| 9,461,577 B2 | 10/2016 | Ried |
| 9,479,070 B2 | 10/2016 | van der Merwe |
| 9,502,981 B2 | 11/2016 | Schaemann et al. |
| 9,504,105 B2 | 11/2016 | Ekbote et al. |
| 9,547,974 B2 | 1/2017 | Wang et al. |
| 9,560,718 B2 | 1/2017 | Sadwick |
| 9,564,846 B2 | 2/2017 | Marcinkiewicz et al. |
| 9,564,848 B2 | 2/2017 | Ishizeki et al. |
| 9,565,731 B2 | 2/2017 | DeJonge |

(56) References Cited

U.S. PATENT DOCUMENTS

| | | |
|---|---|---|
| 9,577,534 B2 | 2/2017 | Ishizeki et al. |
| 9,580,858 B2 | 2/2017 | Maekawa et al. |
| 9,581,626 B2 | 2/2017 | Schwind |
| 9,595,889 B2 | 3/2017 | Li et al. |
| 9,618,249 B2 | 4/2017 | Hatakeyama et al. |
| 9,619,978 B2 | 4/2017 | Kensy et al. |
| 9,621,101 B2 | 4/2017 | Kane |
| 9,625,190 B2 | 4/2017 | Lee et al. |
| 9,634,602 B2 | 4/2017 | Hou et al. |
| 9,640,617 B2 | 5/2017 | Das et al. |
| 9,641,063 B2 | 5/2017 | Ramabhadran et al. |
| 9,641,115 B2 | 5/2017 | Chretien |
| 9,654,048 B2 | 5/2017 | West et al. |
| 9,667,169 B2 | 5/2017 | Nawa et al. |
| 9,683,904 B2 | 6/2017 | Matsumoto et al. |
| 9,692,312 B2 | 6/2017 | Yuasa et al. |
| 9,692,332 B2 | 6/2017 | Taoka et al. |
| 9,696,693 B2 | 7/2017 | Element |
| 9,698,768 B2 | 7/2017 | Leong et al. |
| 9,712,071 B2 | 7/2017 | Yuasa et al. |
| 9,715,913 B1 | 7/2017 | Yin et al. |
| 9,722,488 B2 | 8/2017 | Ishizeki et al. |
| 9,732,991 B2 | 8/2017 | An et al. |
| 9,741,182 B2 | 8/2017 | Zhu |
| 9,742,319 B2 | 8/2017 | Marvelly et al. |
| 9,742,346 B2 | 8/2017 | Esnault |
| 9,746,812 B2 | 8/2017 | Kosaka |
| 9,762,119 B2 | 9/2017 | Kim et al. |
| 9,772,131 B2 | 9/2017 | Hatakeyama et al. |
| 9,772,381 B2 | 9/2017 | Bock et al. |
| 9,780,683 B2 | 10/2017 | Sakakibara et al. |
| 9,787,175 B2 | 10/2017 | Phadke |
| 9,787,246 B2 | 10/2017 | Tsumura et al. |
| 9,791,327 B2 | 10/2017 | Rhee et al. |
| 9,800,138 B2 | 10/2017 | Katsumata |
| 9,813,000 B2 | 11/2017 | Jabusch et al. |
| 9,816,743 B2 | 11/2017 | Nakase et al. |
| 9,819,294 B2 | 11/2017 | Park et al. |
| 9,823,105 B2 | 11/2017 | Lehmkuhl et al. |
| 9,829,226 B2 | 11/2017 | Hatakeyama et al. |
| 9,829,234 B2 | 11/2017 | Hatakeyama et al. |
| 9,837,952 B1 | 12/2017 | Carcia et al. |
| 9,839,103 B2 | 12/2017 | Avrahamy |
| 9,852,559 B2 | 12/2017 | Rettig et al. |
| 9,853,559 B2 | 12/2017 | Taniguchi et al. |
| 9,853,588 B2 | 12/2017 | Green et al. |
| 9,867,263 B2 | 1/2018 | Avrahamy |
| 9,870,009 B2 | 1/2018 | Erwin et al. |
| 9,882,466 B2 | 1/2018 | Kondo et al. |
| 9,888,535 B2 | 2/2018 | Chitta et al. |
| 9,888,540 B2 | 2/2018 | DeJonge |
| 9,893,522 B2 | 2/2018 | Wallace et al. |
| 9,893,603 B2 | 2/2018 | Nishizawa et al. |
| 9,893,668 B2 | 2/2018 | Hart et al. |
| 9,899,916 B2 | 2/2018 | Okamura et al. |
| 9,929,636 B2 | 3/2018 | Shinomoto et al. |
| 9,935,569 B2 | 4/2018 | Tsumura et al. |
| 9,935,571 B2 | 4/2018 | Frampton et al. |
| 9,941,834 B2 | 4/2018 | Tsukano et al. |
| 9,954,473 B2 | 4/2018 | Je et al. |
| 9,954,475 B2 | 4/2018 | Cho et al. |
| 9,965,928 B2 | 5/2018 | Green |
| 9,973,129 B2 | 5/2018 | Schuster et al. |
| 9,998,049 B2 | 6/2018 | Kashima et al. |
| 10,003,277 B2 | 6/2018 | Taguchi et al. |
| 10,014,858 B2 | 7/2018 | Flynn et al. |
| 10,656,026 B2 | 5/2020 | Green et al. |
| 10,763,740 B2 | 9/2020 | Green |
| 10,770,966 B2 | 9/2020 | Marcinkiewicz et al. |
| 2002/0085468 A1 | 7/2002 | Kobayashi |
| 2003/0021127 A1 | 1/2003 | Loef et al. |
| 2003/0117818 A1 | 6/2003 | Ota |
| 2003/0218448 A1 | 11/2003 | Lidak et al. |
| 2004/0136208 A1 | 7/2004 | Agarwal et al. |
| 2004/0183513 A1 | 9/2004 | Vinciarelli |
| 2005/0017695 A1 | 1/2005 | Stanley |
| 2005/0017699 A1 | 1/2005 | Stanley |
| 2005/0028539 A1 | 2/2005 | Singh et al. |
| 2005/0068337 A1 | 3/2005 | Duarte et al. |
| 2005/0076659 A1 | 4/2005 | Wallace et al. |
| 2005/0109047 A1 | 5/2005 | Park et al. |
| 2005/0122082 A1 | 6/2005 | Eckardt |
| 2006/0022648 A1 | 2/2006 | Ben-Yaakov et al. |
| 2006/0245219 A1 | 11/2006 | Li |
| 2007/0012052 A1 | 1/2007 | Butler et al. |
| 2007/0036212 A1 | 2/2007 | Leung et al. |
| 2007/0217233 A1 | 9/2007 | Lim et al. |
| 2008/0000246 A1 | 1/2008 | Ha et al. |
| 2008/0104983 A1 | 5/2008 | Yamai et al. |
| 2008/0115512 A1* | 5/2008 | Rizzo ............... B60H 1/00428 62/134 |
| 2008/0122418 A1 | 5/2008 | Briere et al. |
| 2008/0272748 A1 | 11/2008 | Melanson |
| 2008/0310201 A1 | 12/2008 | Maksimovic |
| 2009/0085625 A1 | 4/2009 | Melanson |
| 2009/0178424 A1 | 7/2009 | Hwang et al. |
| 2009/0251198 A1 | 10/2009 | Rudolph |
| 2009/0273297 A1 | 11/2009 | Kelly |
| 2010/0117545 A1 | 5/2010 | Kelly et al. |
| 2010/0207536 A1 | 8/2010 | Burdalski et al. |
| 2010/0253295 A1* | 10/2010 | Tan ..................... H02M 1/4216 323/205 |
| 2010/0309700 A1 | 12/2010 | Maeda et al. |
| 2011/0012526 A1 | 1/2011 | Kelly |
| 2011/0015788 A1 | 1/2011 | Celik et al. |
| 2011/0030396 A1* | 2/2011 | Marcinkiewicz ..... F25B 49/027 62/89 |
| 2011/0030398 A1* | 2/2011 | Marcinkiewicz ..... F25B 49/027 62/115 |
| 2011/0031911 A1 | 2/2011 | Marcinkiewicz et al. |
| 2011/0031920 A1 | 2/2011 | Henderson et al. |
| 2011/0031942 A1 | 2/2011 | Green |
| 2011/0031943 A1 | 2/2011 | Green |
| 2011/0034176 A1 | 2/2011 | Lord et al. |
| 2011/0141774 A1* | 6/2011 | Kane ..................... H02M 1/126 363/37 |
| 2011/0164339 A1 | 7/2011 | Schmid et al. |
| 2011/0170324 A1 | 7/2011 | Hsieh et al. |
| 2011/0204820 A1 | 8/2011 | Tikkanen et al. |
| 2011/0205161 A1 | 8/2011 | Myers et al. |
| 2011/0304279 A1* | 12/2011 | Felty ................. H05B 41/2925 315/307 |
| 2012/0013282 A1 | 1/2012 | Introwicz |
| 2012/0075310 A1 | 3/2012 | Michail et al. |
| 2012/0153396 A1 | 6/2012 | Sugiura et al. |
| 2012/0153916 A1 | 6/2012 | Weinstein et al. |
| 2012/0179299 A1 | 7/2012 | Gyota et al. |
| 2012/0280637 A1 | 11/2012 | Tikkanen et al. |
| 2012/0313646 A1 | 12/2012 | Nishikawa |
| 2013/0010508 A1 | 1/2013 | Courtel |
| 2013/0020310 A1 | 1/2013 | Hacham |
| 2013/0147269 A1 | 6/2013 | Zimmermann et al. |
| 2013/0170260 A1 | 7/2013 | Kitamura et al. |
| 2013/0182470 A1 | 7/2013 | Chen et al. |
| 2014/0001993 A1 | 1/2014 | Iwata et al. |
| 2014/0015463 A1 | 1/2014 | Merkel et al. |
| 2014/0042948 A1 | 2/2014 | Green et al. |
| 2014/0077770 A1 | 3/2014 | Omoto et al. |
| 2014/0091622 A1 | 4/2014 | Lucas et al. |
| 2014/0169046 A1 | 6/2014 | Chen |
| 2014/0197961 A1 | 7/2014 | Kensy et al. |
| 2014/0292212 A1 | 10/2014 | Gray et al. |
| 2015/0043252 A1 | 2/2015 | Kuang |
| 2015/0084563 A1 | 3/2015 | Lucas et al. |
| 2015/0109077 A1 | 4/2015 | Tomimbang et al. |
| 2015/0191133 A1 | 7/2015 | Okamura et al. |
| 2015/0192346 A1 | 7/2015 | Lee et al. |
| 2015/0214833 A1 | 7/2015 | Ramabhadran et al. |
| 2015/0219503 A1 | 8/2015 | Yoshida |
| 2015/0229204 A1 | 8/2015 | Mao et al. |
| 2015/0236581 A1 | 8/2015 | Chen et al. |
| 2015/0285691 A1 | 10/2015 | Caffee et al. |
| 2015/0326107 A1 | 11/2015 | Hsiao et al. |
| 2015/0333633 A1 | 11/2015 | Chen et al. |

(56) References Cited

U.S. PATENT DOCUMENTS

| | | |
|---|---|---|
| 2015/0354870 A1 | 12/2015 | Lee et al. |
| 2015/0365034 A1 | 12/2015 | Marcinkiewicz et al. |
| 2016/0013740 A1 | 1/2016 | Skinner et al. |
| 2016/0043632 A1 | 2/2016 | Tomioka |
| 2016/0043633 A1 | 2/2016 | Phadke |
| 2016/0094039 A1 | 3/2016 | Winstanley et al. |
| 2016/0117907 A1 | 4/2016 | Wang et al. |
| 2016/0133411 A1 | 5/2016 | Bock et al. |
| 2016/0211791 A1 | 7/2016 | Green et al. |
| 2016/0218624 A1 | 7/2016 | Ishizeki et al. |
| 2016/0248365 A1 | 8/2016 | Ishizeki et al. |
| 2016/0261217 A1 | 9/2016 | Tang |
| 2016/0263331 A1 | 9/2016 | Nessel et al. |
| 2016/0268839 A1 | 9/2016 | Mouridsen |
| 2016/0268949 A1 | 9/2016 | Benn |
| 2016/0268951 A1 | 9/2016 | Cho et al. |
| 2016/0320249 A1 | 11/2016 | Reiman et al. |
| 2016/0329716 A1 | 11/2016 | Inoue |
| 2017/0141709 A1 | 5/2017 | Fukuda et al. |
| 2017/0141717 A1 | 5/2017 | Winstanley et al. |
| 2017/0155347 A1 | 6/2017 | Park et al. |
| 2017/0190530 A1 | 7/2017 | Seki et al. |
| 2017/0201201 A1 | 7/2017 | Aoki et al. |
| 2017/0205103 A1 | 7/2017 | Newcomb |
| 2017/0214341 A1 | 7/2017 | Matthews et al. |
| 2017/0244325 A1 | 8/2017 | Carralero et al. |
| 2017/0264223 A1 | 9/2017 | Kitano et al. |
| 2017/0287721 A1* | 10/2017 | Wood .................... H01L 29/732 |
| 2017/0288561 A1 | 10/2017 | Lemberg et al. |
| 2017/0299444 A1 | 10/2017 | Green |
| 2017/0300107 A1 | 10/2017 | Green et al. |
| 2017/0301192 A1 | 10/2017 | Green |
| 2017/0302158 A1 | 10/2017 | Green |
| 2017/0302159 A1 | 10/2017 | Green et al. |
| 2017/0302160 A1 | 10/2017 | Marcinkiewicz et al. |
| 2017/0302161 A1 | 10/2017 | Green |
| 2017/0302162 A1 | 10/2017 | Green |
| 2017/0302165 A1 | 10/2017 | Marcinkiewicz et al. |
| 2017/0302212 A1 | 10/2017 | Marcinkiewicz et al. |
| 2017/0302214 A1 | 10/2017 | Marcinkiewicz et al. |
| 2017/0317623 A1 | 11/2017 | Taniguchi et al. |
| 2017/0317637 A1 | 11/2017 | VanEyll et al. |
| 2017/0324362 A1 | 11/2017 | Colangelo et al. |
| 2017/0328786 A1 | 11/2017 | Takechi |
| 2017/0373629 A1 | 12/2017 | Shin et al. |
| 2018/0026544 A1 | 1/2018 | Baumann et al. |
| 2018/0034403 A1 | 2/2018 | Kim et al. |
| 2018/0062551 A1 | 3/2018 | Moon et al. |
| 2018/0073934 A1 | 3/2018 | Horng et al. |
| 2018/0076748 A1 | 3/2018 | Yamasaki et al. |
| 2018/0082991 A1 | 3/2018 | Toyoda et al. |
| 2018/0091075 A1 | 3/2018 | Musil |
| 2018/0094512 A1 | 4/2018 | Sadilek et al. |
| 2018/0175752 A1 | 6/2018 | Takeoka et al. |
| 2018/0180490 A1 | 6/2018 | Barbier et al. |
| 2018/0191261 A1 | 7/2018 | Chung et al. |
| 2018/0191288 A1 | 7/2018 | Li et al. |

FOREIGN PATENT DOCUMENTS

| | | |
|---|---|---|
| CN | 101763699 A | 6/2010 |
| CN | 201522062 U | 7/2010 |
| CN | 102270367 A | 12/2011 |
| CN | 102364814 A | 2/2012 |
| CN | 202134068 U | 2/2012 |
| CN | 102412712 A | 4/2012 |
| CN | 103001463 A | 3/2013 |
| CN | 103078475 A | 5/2013 |
| CN | 103822334 A | 5/2014 |
| CN | 103927832 A | 7/2014 |
| CN | 203775025 U | 8/2014 |
| CN | 104620498 A | 5/2015 |
| CN | 104764287 A | 7/2015 |
| CN | 104916088 A | 9/2015 |
| CN | 105078416 A | 11/2015 |
| CN | 105207652 A | 12/2015 |
| CN | 105444340 A | 3/2016 |
| EP | 0377538 A2 | 7/1990 |
| EP | 0744816 A2 | 11/1996 |
| EP | 1271067 A1 | 1/2003 |
| EP | 1641113 A1 | 3/2006 |
| EP | 1689069 A2 | 8/2006 |
| EP | 2237402 A1 | 10/2010 |
| EP | 2403120 A2 | 1/2012 |
| EP | 2983283 A1 | 2/2016 |
| JP | H11237427 A | 8/1999 |
| JP | 2001289549 A | 10/2001 |
| JP | 2006134607 A | 5/2006 |
| JP | 2010541256 A | 12/2010 |
| JP | 2011160508 A | 8/2011 |
| JP | 2011193647 A | 9/2011 |
| JP | 2015080316 A | 4/2015 |
| KR | 20040025420 A | 3/2004 |
| KR | 20110092055 A | 8/2011 |
| KR | 20130067440 A | 6/2013 |
| WO | WO-2007035407 A1 | 3/2007 |
| WO | WO-2010143239 A1 | 12/2010 |
| WO | WO-2011074972 A1 | 6/2011 |

OTHER PUBLICATIONS

Written Opinion of the International Searching Authority regarding International Application No. PCT/US2017/027691, dated Aug. 18, 2017.
International Search Report regarding International Application No. PCT/US2017/027744, dated Aug. 18, 2017.
Written Opinion of the International Searching Authority regarding International Application No. PCT/US2017/027744, dated Aug. 18, 2017.
International Search Report regarding International Application No. PCT/US2017/027738, dated Aug. 18, 2017.
Written Opinion of the International Searching Authority regarding International Application No. PCT/US2017/027738, dated Aug. 18, 2017.
Office Action regarding U.S. Appl. No. 15/419,394, dated Sep. 11, 2017.
International Search Report regarding International Application No. PCT/US2017/027710, dated Sep. 20, 2017.
Written Opinion of the International Searching Authority regarding International Application No. PCT/US2017/027710, dated Sep. 20, 2017.
Amit Kumar Sinha et al. "SEPIC Based PFC Converter for PMBLDCM Drive in Air Conditioning System." International Journal of Advanced Computer Research, vol. 3, No. 1, Issue 8. Mar. 2013.
International Search Report regarding International Application No. PCT/US2017/027721, dated Sep. 20, 2017.
Written Opinion of the International Searching Authority regarding International Application No. PCT/US2017/027721, dated Sep. 20, 2017.
International Search Report regarding International Application No. PCT/US2017/027699, dated Sep. 20, 2017.
Written Opinion of the International Searching Authority regarding International Application No. PCT/US2017/027699, dated Sep. 20, 2017.
Advisory Action regarding U.S. Appl. No. 15/419,394 dated Mar. 12, 2018.
Applicant-Initiated Interview Summary regarding U.S. Appl. No. 15/487,201 dated Mar. 5, 2018.
Restriction Requirement regarding U.S. Appl. No. 15/487,151 dated Apr. 5, 2018.
Non-Final Office Action regarding U.S. Appl. No. 15/487,101 dated Apr. 9, 2018.
Interview Summary regarding U.S. Appl. No. 15/419,423 dated Feb. 21, 2018.
Notice of Allowance regarding U.S. Appl. No. 15/430,978 dated Feb. 22, 2018.
Final Office Action regarding U.S. Appl. No. 15/487,201 dated Apr. 19, 2018.

(56) References Cited

OTHER PUBLICATIONS

Applicant-Initiated Interview Summary regarding U.S. Appl. No. 15/419,394, dated Oct. 30, 2017.
International Search Report regarding International Application No. PCT/US2017/027726, dated Sep. 12, 2017.
Written Opinion of the International Searching Authority regarding International Application No. PCT/US2017/027726, dated Sep. 12, 2017.
International Search Report regarding International Application No. PCT/US2017/027729, dated Sep. 13, 2017.
Written Opinion of the International Searching Authority regarding International Application No. PCT/US2017/027729, dated Sep. 13, 2017.
Office Action regarding U.S. Appl. No. 15/419,394, dated Dec. 7, 2017.
Office Action regarding U.S. Appl. No. 15/419,464 dated Dec. 29, 2017.
Office Action regarding U.S. Appl. No. 15/419,423 dated Jan. 8, 2018.
Office Action regarding U.S. Appl. No. 15/487,201 dated Jan. 9, 2018.
Interview Summary regarding U.S. Appl. No. 15/419,394 dated Jan. 29, 2018.
U.S. Appl. No. 15/419,349, filed Jan. 30, 2017, Charles E. Green.
U.S. Appl. No. 15/419,394, filed Jan. 30, 2017, Charles E. Green.
U.S. Appl. No. 15/419,423, filed Jan. 30, 2017, Charles E. Green.
U.S. Appl. No. 15/419,464, filed Jan. 30, 2017, Charles E. Green.
U.S. Appl. No. 15/430,978, filed Feb. 13, 2017, Charles E. Green.
U.S. Appl. No. 15/487,027, filed Apr. 13, 2017, Joseph G. Marcinkiewicz.
U.S. Appl. No. 15/487,101, filed Apr. 13, 2017, Joseph G. Marcinkiewicz.
U.S. Appl. No. 15/487,151, filed Apr. 13, 2017, Charles E. Green.
U.S. Appl. No. 15/487,175, filed Apr. 13, 2017, Joseph G. Marcinkiewicz.
U.S. Appl. No. 15/487,426, filed Apr. 13, 2017, Charles E. Green.
U.S. Appl. No. 15/943,660, filed Apr. 2, 2018, Charles E. Green.
Corrected Notice of Allowability regarding U.S. Appl. No. 15/419,394 dated Sep. 10, 2018.
Notice of Allowance regarding U.S. Appl. No. 15/419,394 dated Aug. 27, 2018.
Non-Final Office Action regarding U.S. Appl. No. 15/419,423 dated May 14, 2018.
Notice of Allowance regarding U.S. Appl. No. 15/419,464 dated May 11, 2018.
Notice of Allowance regarding U.S. Appl. No. 15/419,394 dated May 11, 2018.
Applicant-Initiated Interview Summary regarding U.S. Appl. No. 15/487,201 dated May 30, 2018.
Restriction Requirement regarding U.S. Appl. No. 15/487,175 dated May 16, 2018.
Applicant-Initiated Interview Summary regarding U.S. Appl. No. 15/487,027 dated Jun. 21, 2018.
Applicant-Initiated Interview Summary regarding U.S. Appl. No. 15/487,101 dated Jun. 21, 2018.
Notice of Allowance regarding U.S. Appl. No. 15/419,394 dated Jul. 20, 2018.
Notice of Allowance regarding U.S. Appl. No. 15/487,201 dated Jul. 20, 2018.
Applicant-Initiated Interview Summary regarding U.S. Appl. No. 15/419,423 dated Aug. 9, 2018.
Notice of Allowance regarding U.S. Appl. No. 15/419,464 dated Sep. 24, 2018.
Non-Final Office Action regarding U.S. Appl. No. 15/419,349 dated Oct. 18, 2018.
Non-Final Office Action regarding U.S. Appl. No. 15/419,423 dated Oct. 11, 2018.
Notice of Allowance regarding U.S. Appl. No. 15/487,027 dated Oct. 2, 2018.
Notice of Allowance regarding U.S. Appl. No. 15/487,175 dated Oct. 3, 2018.
Final Office Action regarding U.S. Appl. No. 15/487,101 dated Nov. 14, 2018.
Notice of Allowance regarding U.S. Appl. No. 15/487,151 dated Oct. 25, 2018.
Non-Final Office Action regarding U.S. Appl. No. 15/419,349 dated Apr. 18, 2019.
Applicant-Initiated Interview Summary regarding U.S. Appl. No. 15/419,423 dated Dec. 12, 2018.
Non-Final Office Action regarding U.S. Appl. No. 15/487,175 dated Jan. 10, 2019.
Applicant-Initiated Interview Summary regarding U.S. Appl. No. 15/419,423 dated Mar. 28, 2019.
Applicant-Initiated Interview Summary regarding U.S. Appl. No. 15/487,101 dated Jan. 13, 2019.
EPO Communication regarding Rules 161/162 for related PCT Application No. US2017027691 dated Nov. 23, 2018.
Non-Final Office Action regarding U.S. Appl. No. 15/419,423 dated Jan. 29, 2019.
Notice of Allowance regarding U.S. Appl. No. 15/419,394 dated Jan. 11, 2019.
Notice of Allowance regarding U.S. Appl. No. 15/487,101 dated Feb. 1, 2019.
Notice of Allowance regarding U.S. Appl. No. 15/487,151 dated Jan. 9, 2019.
Notice of Allowance regarding U.S. Appl. No. 15/419,464 dated Jan. 25, 2019.
Notice of Allowance regarding U.S. Appl. No. 15/487,027 dated Jan. 25, 2019.
Notice of Allowance regarding U.S. Appl. No. 15/943,660 dated Jan. 25, 2019.
Non-Final Office Action regarding U.S. Appl. No. 15/419,423 dated May 23, 2019.
Notice of Allowance regarding U.S. Appl. No. 15/943,660 dated May 22, 2019.
Final Office Action regarding U.S. Appl. No. 15/419,423 dated Aug. 30, 2019.
Non-Final Office Action regarding U.S. Appl. No. 15/419,349 dated Oct. 4, 2019.
Non-Final Office Action regarding U.S. Appl. No. 16/43,548 dated Sep. 30, 2019.
Advisory Action regarding U.S. Appl. No. 15/487,175 dated Oct. 24, 2019.
Advisory Action regarding U.S. Appl. No. 15/419,423 dated Nov. 21, 2019.
Applicant-Initiated Interview Summary regarding U.S. Appl. No. 16/433,548 dated Dec. 11, 2019.
Supplementary Search Report for EP 17783287 dated Nov. 22, 2019; 8 pages.
Notice of Allowance regarding U.S. Appl. No. 15/419,349 dated Jan. 10, 2020.
First Office Action for Chinese Application No. CN201780029917.6 dated Jan. 20, 2020. Translation provided.
European Search Report on Euripean Patent Application No. EP 17 78 3275 dated Nov. 13, 2019.
Choi Bo H et al.: "A Novel Single-SIC-Switch-Based ZVZCS Tapped Boost Converter", IEEE Transactions On Power Electronics, Institute of Electrical and Electronics Engineers, USA, vol. 29, No. 10, Oct. 1, 2014 (Oct. 1, 2014), pp. 5181-5194, XP011549983, ISSN: 0885-8993, DOI: 10.1109/TPEL.2013.2293813 [retrieved on Jun. 2, 2014].
Final Office Action regarding U.S. Appl. No. 16/433,548 dated Mar. 30, 2020.
Notice of Allowance regarding U.S. Appl. No. 15/419,423 dated Apr. 15, 2020.
First Office Action for Chinese Application No. CN201780035647.X dated Mar. 26, 2020. Translation provided.
Notice of Allowance regarding U.S. Appl. No. 15/487,175 dated Apr. 17, 2020.
Notice of Allowance regarding U.S. Appl. No. 15/419,423 dated Apr. 27, 2020.

(56) References Cited

OTHER PUBLICATIONS

Supplemental Notice of Allowance regarding U.S. Appl. No. 15/419,423 dated Jun. 26, 2020.
Supplemental Notice of Allowability regarding U.S. Appl. No. 15/419,423 dated Aug. 6, 2020.
Notice of Allowance regarding U.S. Appl. No. 16/595,277 dated Oct. 20, 2020.
European Office Action regarding Application No. 17783267.2 dated Oct. 28, 2020.
Second Chinese Office Action regarding Application No. 201780030180.X dated Aug. 12, 2020. English translation provided by Unitalen Attorneys at Law.
Second Chinese Office Action regarding Application No. 201780032245.4 dated Dec., 2020. English translation provided by Unitalen Attorneys at Law.
Second Chinese Office Action regarding Application No. 201780030179.7 dated Dec. 2, 2020. English translation provided by Unitalen Attorneys at Law.
Chinese Office Action regarding Application No. 201780035647.X dated Dec. 2, 2020. English translation provided by Unitalen Attorneys at Law.
First Chinese Office Action regarding Application No. 201780030215.X dated Jan. 6, 2021. English translation provided by Unitalen Attorneys at Law.

\* cited by examiner

//www.hj8828.com/ US 11,387,729 B2

BUCK-CONVERTER-BASED DRIVE CIRCUITS FOR DRIVING MOTORS OF COMPRESSORS AND CONDENSER FANS

CROSS-REFERENCE TO RELATED APPLICATIONS

This application claims the benefit of U.S. Provisional Application No. 62/323,498, filed on Apr. 15, 2016, U.S. Provisional Application No. 62/323,505, filed Apr. 15, 2016, U.S. Provisional Application No. 62/323,607, filed Apr. 15, 2016, U.S. Provisional Application No. 62/398,641, filed on Sep. 23, 2016, and U.S. Provisional Application No. 62/398,658, filed on Sep. 23, 2016. The entire disclosures of the applications referenced above are incorporated herein by reference.

FIELD

The present disclosure relates to systems for displaying messages with respect to compressor system operation.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Compressors are used in a wide variety of industrial and residential applications including, but not limited to, heating, ventilating, and air conditioning (HVAC) systems. Electric motors are used to power and/or actuate elements of the compressors. A control system for controlling operation of an electric motor of a compressor can include a drive. The drive can include: a power factor correction (PFC) circuit; filters, such as an electromagnetic interference (EMI) filter and a direct current filter; an inverter power circuit; a processor; and other circuit components.

A drive of a compressor may include a rectifier that converts, for example, alternating current (AC) power received via utility power source via power lines to a direct current (DC) voltage, which is received at a DC bus. The DC bus provides the DC voltage to an inverter. The inverter converts the DC voltage to an AC voltage that is supplied to a compressor. A condenser fan motor may be connected (i) to the power lines that provide power to the drive, (ii) via a fan inverter, to a DC bus connected to an output of a PFC circuit, or (iii) to power lines connected to and providing power to the compressor. The power lines and the DC bus can be at high voltage potentials. For example, the utility power lines may be at 575 VAC and the DC bus may be at 810 VDC. As a result, the condenser fan motor is rated for 575 VAC. Typically, the condenser fan motor is rated for the same AC voltage as the power lines supplying power to the drive. In general, the higher the AC voltage rating of the condenser fan motor, the more specialized and/or costly the condenser fan motor.

SUMMARY

A drive circuit is provided and includes a rectification circuit, a buck converter, a first inverter, and a second inverter. The rectification circuit is configured to rectify a first AC voltage signal to generate a rectified voltage signal. The buck converter is configured to downconvert the rectified voltage signal to a DC voltage signal, wherein the DC voltage signal is supplied to a DC bus. The first inverter is configured to convert the DC voltage signal to a second AC voltage signal and supply the second AC voltage signal to a compressor motor. The second inverter is configured to convert the DC voltage signal to a third AC voltage signal and supply the third AC voltage signal to a condenser fan motor. Peak voltages of the second AC voltage signal and the third AC voltage signal are less than peak voltages of the first AC voltage signal.

In other features, a drive circuit includes a rectification circuit, a buck converter, a first inverter and a condenser fan motor. The rectification circuit is configured to rectify a first AC voltage signal to generate a rectified voltage signal. The buck converter is configured to downconvert the rectified voltage signal to a first direct current (DC) voltage signal, wherein the first DC voltage signal is supplied to a DC bus. The first inverter is configured to convert the first DC voltage signal to a second AC voltage signal and supply the second AC voltage signal to a compressor motor. The condenser fan motor assembly is configured to receive the first DC voltage signal and one of: convert the first DC voltage signal to a third AC voltage signal and supply the third AC voltage signal to a condenser fan motor; pulse the first DC voltage signal and supply the pulsed first DC voltage signal to the condenser fan motor; and convert the first DC voltage signal to a second DC voltage signal and supply a pulsed version of the second DC voltage signal to the condenser fan motor.

In other features, a drive circuit is provided and includes a rectification circuit, a buck converter, and a first inverter. The rectification circuit is configured to rectify a first AC voltage signal to generate a rectified voltage signal. The buck converter is configured to downconvert the rectified voltage signal to a DC voltage signal, where the DC voltage signal is supplied to a DC bus. The first inverter is configured to convert the DC voltage signal to a second AC voltage signal and supply the second AC voltage signal to a compressor motor and to a condenser fan motor. Peak voltages of the second AC voltage signal are less than peak voltages of the first AC voltage signal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

A refrigeration system includes a drive, a compressor and a condenser fan motor. The drive receives power from a utility power source via power lines and supplies the power to a compressor. The condenser fan motor may receive power from the power lines supplying power to the drive or receive power directly from the drive. The condenser fan motor may be rated for an AC voltage on the power lines. If this AC voltage is high (e.g., 575 VAC), the cost of the condenser fan motor is also high due to the need for high-voltage rated windings and satisfaction of high-voltage insulation to ground requirements. These types of condenser fan motors are typically produced in low volumes, which further increase costs of the condenser fan motors.

To minimize cost of a condenser fan motor, a required peak voltage rating of the condenser fan motor may be decreased by connecting the condenser fan motor to power lines supplying power to the drive via a transformer. The transformer downconverts a first AC voltage (e.g., 575 VAC or 600 VAC) of power lines supplying power to the drive to provide a second AC voltage (e.g., 480 VAC or 230 VAC), which can then be provided to the condenser fan motor. Although this reduces the peak voltage requirements and costs of the condenser fan motor, costs are increased due to use of the transformer. Also, the transformer to perform the stated downconversion can be large and heavy.

Compressor drives and corresponding circuits set forth herein include the use of buck converters to reduce peak voltage requirements of condenser fan motors. The buck converters reduce peak voltages received by condenser fan motors and provide output voltages that may be adjusted during operation. The disclosed embodiments are applicable to AC motors, DC motors, Induction motors, permanent magnetic motors, single phase motors, 3-phase motors, and/or other types of condenser fan motors.

Refrigeration System

Figure 1:
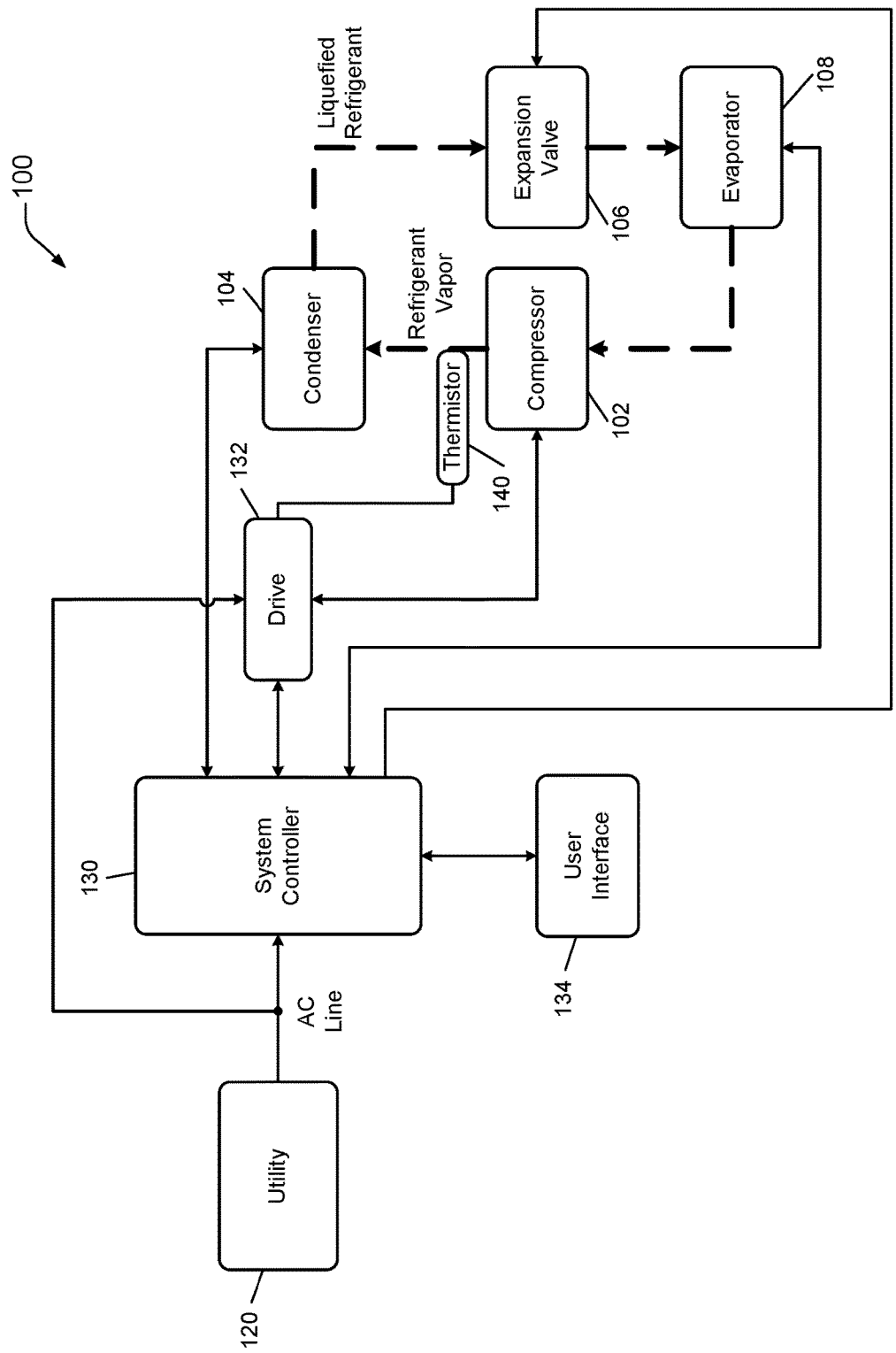
FIG. 1 is a functional block diagram of an example refrigeration system.

FIG. 1 is a functional block diagram of an example refrigeration system 100 including a compressor 102, a condenser 104, an expansion valve 106, and an evaporator 108. According to the principles of the present disclosure, the refrigeration system 100 may include additional and/or alternative components, such as a reversing valve or a filter-drier. In addition, the present disclosure is applicable to other types of refrigeration systems including, but not limited to, heating, ventilating, and air conditioning (HVAC), heat pump, refrigeration, and chiller systems.

The compressor 102 receives refrigerant in vapor form and compresses the refrigerant. The compressor 102 provides pressurized refrigerant in vapor form to the condenser 104. The compressor 102 includes an electric motor (or compressor motor) that drives a pump. For example only, the pump of the compressor 102 may include a scroll compressor and/or a reciprocating compressor.

All or a portion of the pressurized refrigerant is converted into liquid form within the condenser 104. The condenser 104 transfers heat away from the refrigerant, thereby cooling the refrigerant. When the refrigerant vapor is cooled to a temperature that is less than a saturation temperature, the refrigerant transforms into a liquid (or liquefied) refrigerant. The condenser 104 may include an electric fan that increases the rate of heat transfer away from the refrigerant.

The condenser 104 provides the refrigerant to the evaporator 108 via the expansion valve 106. The expansion valve 106 controls the flow rate at which the refrigerant is supplied to the evaporator 108. The expansion valve 106 may include a thermostatic expansion valve or may be controlled electronically by, for example, a system controller 130. A pressure drop caused by the expansion valve 106 may cause a portion of the liquefied refrigerant to transform back into the vapor form. In this manner, the evaporator 108 may receive a mixture of refrigerant vapor and liquefied refrigerant.

The refrigerant absorbs heat in the evaporator 108. Liquid refrigerant transitions into vapor form when warmed to a temperature that is greater than the saturation temperature of the refrigerant. The evaporator 108 may include an electric fan that increases the rate of heat transfer to the refrigerant.

A utility 120 provides power to the refrigeration system 100. For example only, the utility 120 may provide single-phase alternating current (AC) power at approximately 230 Volts root mean squared ($V_{RMS}$). In other implementations, the utility 120 may provide three-phase AC power at approximately 400 $V_{RMS}$, 480 $V_{RMS}$, or 600 $V_{RMS}$ at a line frequency of, for example, 50 or 60 Hz. When the three-phase AC power is nominally 600 $V_{RMS}$, the actual available voltage of the power may be 575 $V_{RMS}$.

The utility 120 may provide the AC power to the system controller 130 via an AC line, which includes two or more conductors. The AC power may also be provided to a drive 132 via the AC line. The system controller 130 controls the refrigeration system 100. For example only, the system controller 130 may control the refrigeration system 100 based on user inputs and/or parameters measured by various sensors (not shown). The sensors may include pressure sensors, temperature sensors, current sensors, voltage sensors, etc. The sensors may also include feedback information from the drive control, such as motor currents or torque, over a serial data bus or other suitable data buses.

A user interface 134 provides user inputs to the system controller 130. The user interface 134 may additionally or alternatively provide the user inputs directly to the drive 132. The user inputs may include, for example, a desired temperature, requests regarding operation of a fan (e.g., a request for continuous operation of the evaporator fan), and/or other suitable inputs. The user interface 134 may take the form of a thermostat, and some or all functions of the system controller (including, for example, actuating a heat source) may be incorporated into the thermostat.

The system controller 130 may control operation of the fan of the condenser 104, the fan of the evaporator 108, and the expansion valve 106. The drive 132 may control the compressor 102 based on commands from the system controller 130. For example only, the system controller 130 may instruct the drive 132 to operate the motor of the compressor 102 at a certain speed or to operate the compressor 102 at a certain capacity. In various implementations, the drive 132 may also control the condenser fan.

A thermistor 140 is thermally coupled to the refrigerant line exiting the compressor 102 that conveys refrigerant vapor to the condenser 104. The variable resistance of the thermistor 140 therefore varies with the discharge line temperature (DLT) of the compressor 102. As described in more detail, the drive 132 monitors the resistance of the thermistor 140 to determine the temperature of the refrigerant exiting the compressor 102.

The DLT may be used to control the compressor 102, such as by varying capacity of the compressor 102, and may also be used to detect a fault. For example, if the DLT exceeds the threshold, the drive 132 may power down the compressor 102 to prevent damage to the compressor 102.

Drive

Figure 2:
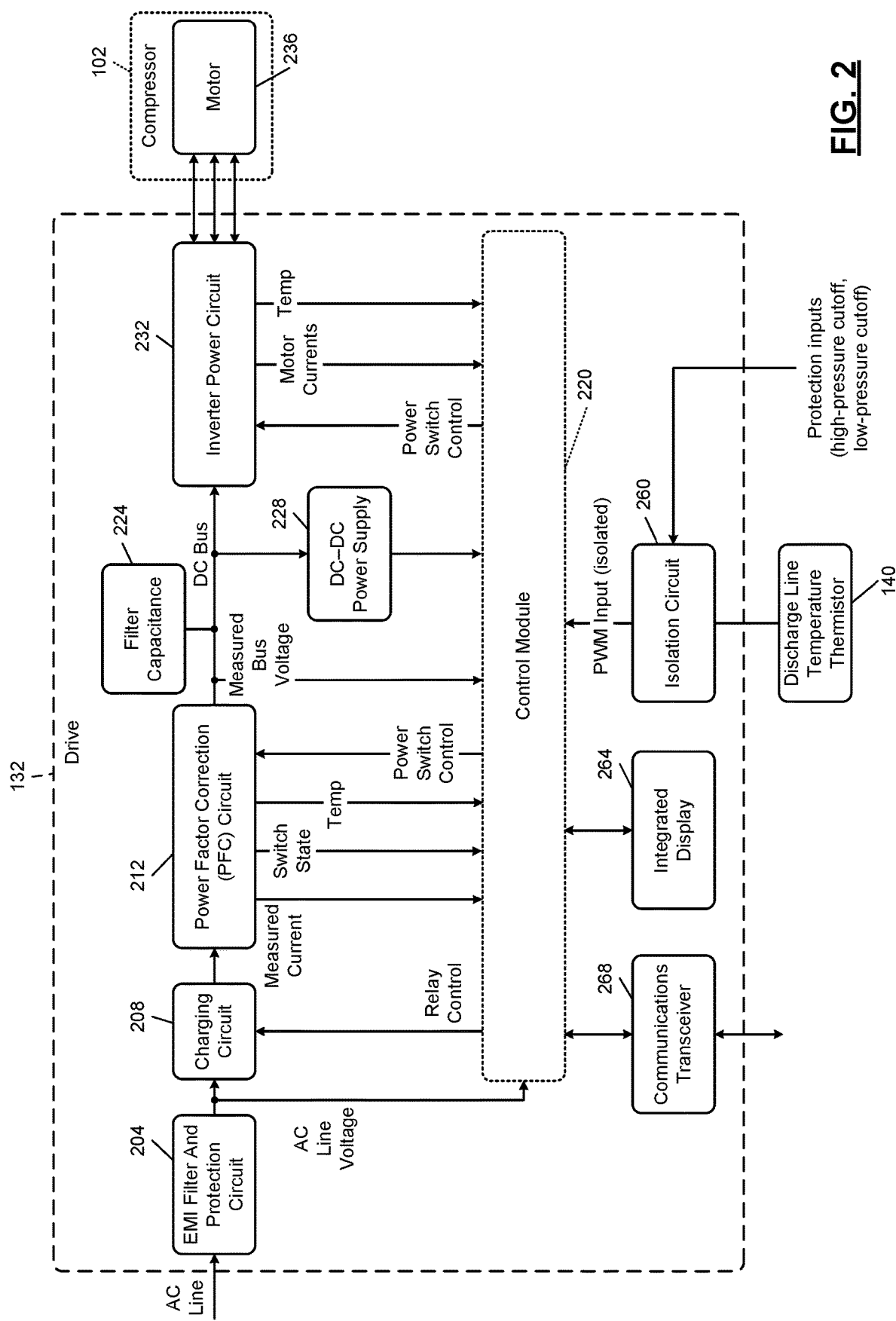
FIG. 2 is a block diagram of an example implementation of the compressor motor drive of FIG. 1.

In FIG. 2, an example implementation of the drive 132 includes an electromagnetic interference (EMI) filter and protection circuit 204, which receives power from an AC line. The EMI filter and protection circuit 204 reduces EMI that might otherwise be injected back onto the AC line from the drive 132. The EMI filter and protection circuit 204 may also remove or reduce EMI arriving from the AC line. Further, the EMI filter and protection circuit 204 protects against power surges, such as may be caused by lightening, and/or other other types of power surges and sags.

A charging circuit 208 controls power supplied from the EMI filter and protection circuit 204 to a power factor correction (PFC) circuit 212. For example, when the drive 132 initially powers up, the charging circuit 208 may place a resistance in series between the EMI filter and protection circuit 204 and the PFC circuit 212 to reduce the amount of current inrush. These current or power spikes may cause various components to prematurely fail.

After initial charging is completed, the charging circuit 208 may close a relay that bypasses the current-limiting resistor. For example, a control module 220 may provide a relay control signal to the relay within the charging circuit 208. In various implementations, the control module 220 may assert the relay control signal to bypass the current-limiting resistor after a predetermined period of time following start up, or based on closed loop feedback indicating that charging is near completion.

The PFC circuit 212 provides a power factor correction between an inputted AC and a generated DC. A power factor is an indicator of a relationship between current and voltage in a circuit, or how effectively a circuit uses real power as compared to reactive power, which is stored and returned to a power source. A power factor can be expressed as a value between zero and one. A power factor can be equal to a ratio of actual electrical power dissipated by a circuit relative to a product of root mean squared (RMS) values of current and voltage for the circuit. The power factor approaches 1 as this ratio increases. The PFC circuit can be implemented to increase a power factor of a drive, thereby increasing an amount of real power used by the circuit as compared with an amount of reactive power the circuit stores and returns to the power source.

The PFC circuit 212 converts incoming AC power to DC power. The PFC circuit 212 may not be limited to PFC functionality—for example, the PFC circuit 212 may also perform voltage conversion functions, such as acting as a boost circuit and/or a buck circuit. In some implementations, the PFC circuit 212 may be replaced by a non-PFC voltage converter. The DC power may have voltage ripples, which are reduced by filter capacitance 224. Filter capacitance 224 may include one or more capacitors arranged in parallel and connected to the DC bus. The PFC circuit 212 may attempt to draw current from the AC line in a sinusoidal pattern that matches the sinusoidal pattern of the incoming voltage. As the sinusoids align, the power factor approaches one, which represents the greatest efficiency and the least demanding load on the AC line.

The PFC circuit 212 includes one or more switches that are controlled by the control module 220 using one or more signals labeled as power switch control. The control module 220 determines the power switch control signals based on a measured voltage of the DC bus, measured current in the PFC circuit 212, AC line voltages, temperature or temperatures of the PFC circuit 212, and the measured state of a power switch in the PFC circuit 212. While the example of use of measured values is provided, the control module 220 may determine the power switch control signals based on an estimated voltage of the DC bus, estimated current in the PFC circuit 212, estimated AC line voltages, estimated temperature or temperatures of the PFC circuit 212, and/or the estimated or expected state of a power switch in the PFC circuit 212. In various implementations, the AC line voltages are measured or estimated subsequent to the EMI filter and protection circuit 204 but prior to the charging circuit 208.

The control module 220 is powered by a DC-C power supply 228, which provides a voltage suitable for logic of the control module 220, such as 3.3 Volts, 2.5 Volts, etc. The DC-DC power supply 228 may also provide DC power for operating switches of the PFC circuit 212 and an inverter power circuit 232. For example only, this voltage may be a higher voltage than for digital logic, with 15 Volts being one example.

The inverter power circuit 232 also receives power switch control signals from the control module 220. In response to the power switch control signals, switches within the inverter power circuit 232 cause current to flow in respective windings of a motor 236 of the compressor 102. The control module 220 may receive a measurement or estimate of motor current for each winding of the motor 236 or each leg of the inverter power circuit 232. The control module 220 may also receive a temperature indication from the inverter power circuit 232.

For example only, the temperature received from the inverter power circuit 232 and the temperature received from the PFC circuit 212 are used only for fault purposes. In other words, once the temperature exceeds a predetermined threshold, a fault is declared and the drive 132 is either powered down or operated at a reduced capacity. For example, the drive 132 may be operated at a reduced capacity and if the temperature does not decrease at a predetermined rate, the drive 132 transitions to a shutdown state.

The control module 220 may also receive an indication of the discharge line temperature from the compressor 102 using the thermistor 140. An isolation circuit 260 may provide a pulse-width-modulated representation of the resistance of the thermistor 140 to the control module 220. The isolation circuit 260 may include galvanic isolation so that there is no electrical connection between the thermistor 140 and the control module 220.

The isolation circuit 260 may further receive protection inputs indicating faults, such as a high-pressure cutoff or a low-pressure cutoff, where pressure refers to refrigerant pressure. If any of the protection inputs indicate a fault and, in some implementations, if any of the protection inputs become disconnected from the isolation circuit 260, the isolation circuit 260 ceases sending the PWM temperature signal to the control module 220. Therefore, the control module 220 may infer that a protection input has been received from an absence of the PWM signal. The control module 220 may, in response, shut down the drive 132.

The control module 220 controls an integrated display 264, which may include a grid of LEDs and/or a single LED package, which may be a tri-color LED. The control module 220 can provide status information, such as firmware versions, as well as error information using the integrated display 264. The control module 220 communicates with external devices, such as the system controller 130 in FIG. 1, using a communications transceiver 268. For example only, the communications transceiver 268 may conform to the RS-485 or RS-232 serial bus standards or to the Controller Area Network (CAN) bus standard.

PFC Circuits

Figure 3A:
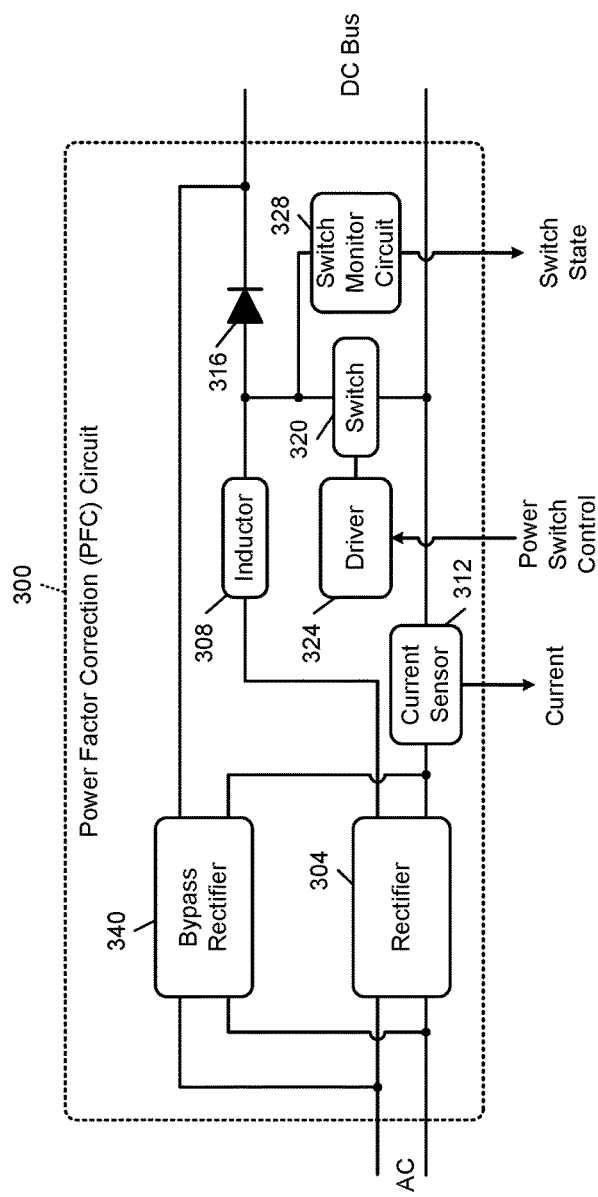
FIG. 3A is a block diagram of an example implementation of the power factor correction (PFC) circuit of FIG. 2.

In FIG. 3A, a PFC circuit 300 is one implementation of the PFC circuit 212 of FIG. 2. The PFC circuit 300 includes a rectifier 304 that converts incoming AC into pulsating DC. In various implementations, the rectifier 304 includes a full-wave diode bridge. The DC output of the rectifier 304 is across first and second terminals. The first terminal is connected to an inductor 308, while the second terminal is connected to a current sensor 312. An opposite end of the inductor 308 is connected to a node that is common to the inductor 308, an anode of a diode 316, and a first terminal of a switch 320.

The PFC circuit 300 generates a DC bus, where a first terminal of the DC bus is connected to a cathode of the diode 316 while a second terminal of the DC bus is connected to the second output terminal of the rectifier 304 via the current sensor 312. The current sensor 312 can, therefore, sense the current within the switch 320 as well as the current in the DC bus and current in the inductor 308. The second terminal of the DC bus is also connected to a second terminal of the switch 320.

A driver 324 receives the power switch control signal from the control module 220 of FIG. 2 and rapidly charges or discharges a control terminal of the switch 320. For example, the switch 320 may be a field effect transistor with a gate terminal as the control terminal. More specifically, the switch 320 may be a power metal-oxide-semiconductor field-effect transistor (MOSFET), such as the STW38N65M5 power MOSFET from STMicroelectronics. The driver 324, in response to the power switch control signal, charges or discharges the capacitance at the gate of the field effect transistor.

A switch monitor circuit 328 measures whether the switch is on or off. This closed loop control enables the control module 220 to determine whether the switch 320 has reacted to a command provided by the power switch control signal and may also be used to determine how long it takes the switch 320 to respond to that control signal. The measured switch state is output from the switch monitor circuit 328 back to the control module 220. The control module 220 may update its control of the power switch control signal to compensate for delays in turning on and/or turning off the switch 320.

In FIG. 3A, the inductor, the switch 320, and the diode 316 are arranged in a boost configuration. In brief, the switch 320 closes, causing current through the inductor 308 to increase. Then the switch 320 is opened, but the current through the inductor 308 cannot change instantaneously because the voltage across an inductor is proportional to the derivative of the current. The voltage across the inductor 308 becomes negative, meaning that the end of the inductor 308 connected to the anode of the diode 316 experiences a voltage increase above the voltage output from the rectifier 304.

Once the voltage at the anode of the diode 316 increases above the turn-on voltage of the diode 316, the current through the inductor 308 can be fed through the diode 316 to the DC bus. The current through the inductor 308 decreases and then the switch 320 is closed once more, causing the current and the inductor 308 to increase.

In various implementations, the switch 320 may be turned on until the current sensor 312 determines that a predetermined threshold of current has been exceeded. At that time, the switch 320 is turned off for a specified period of time. This specified period may be adaptive, changing along with the voltage of the DC bus as well as the voltage of the AC input change. However, the off time (when the switch 320 is open) is a specified value. Once a time equal to the specified value has elapsed, the switch 320 is turned back on again and the process repeats. The off time can be fixed or variable. In the case of the off time being variable, the off time can be limited to at least a predetermined minimum off time.

To reduce the physical size and parts cost of the PFC circuit 300, the inductance of the inductor 308 (which may be the largest contributor to the physical size of the PFC circuit 300) may be lowered. However, with a lower inductance, the inductor 308 will saturate more quickly. Therefore, the switch 320 will have to operate more quickly. While more quickly and smaller are relative terms, present power switching control operates in the range of 10 kilohertz to 20 kilohertz switching frequencies. In the present application, the switching frequency of the switch 320 may be increased to more than 50 kilohertz, more than 100 kilohertz, or more than 200 kilohertz. For example, the switching frequency of the switch may be controlled to be approximately 200 kilohertz.

The switch 320 is therefore chosen to allow for faster switching as well as to have low switching losses. With faster switching, the inductance of the inductor 308 can be smaller. In addition, the diode 316 may need to be faster. Silicon carbide diodes may have fast response times. For example, the diode 316 may be an STPSC2006CW Silicon Carbide dual diode package from STMicroelectronics.

In order to accurately drive the switch 320 when operating at higher speeds, the control strategy must similarly be accelerated. For example only, the control module 220 may include multiple devices, such as a microcontroller configured to perform more involved calculations and an FPGA (field programmable gate array) or PLD (programmable logic device) configured to monitor and respond to inputs in near real time. In this context, near real time means that the time resolution of measurement and time delay in responding to inputs of the FPGA or PLD is negligible compared to the physical time scale of interest. For faster switching speeds, the near real time response of the FPGA/PLD may introduce non-negligible delays. In such cases, the delay of the FPGA/PLD and driving circuitry may be measured and compensated for. For example, if the turn-off of a switch occurs later than needed because of a delay, the turn-off can be instructed earlier to compensate for the delay.

A bypass rectifier 340 is connected in parallel with the rectifier 304 at the AC line input. A second output terminal of the bypass rectifier 340 is connected to the second terminal rectifier 304. However, a first output terminal of the bypass rectifier 340 is connected to the cathode of the diode 316.

As a result, when the PFC circuit 300 is not operating to boost the DC bus voltage, the bypass rectifier 340 will be active when the line-to-line voltage of the AC input exceeds the voltage across the DC bus. The bypass rectifier 340, in these situations, diverts current from passing through the diode 316. Because the inductor 308 is small, and the switch 320 switches rapidly, the diode 316 is also selected to exhibit fast switching times. The diode 316 may, therefore, be less tolerant to high currents, and so current is selectively shunted around the diode 316 by the bypass rectifier 340.

In addition, the current path through the rectifier 304 and the diode 316 experiences three diode voltage drops or two diode voltage drops and the switch voltage drop, while the path through the bypass rectifier 340 experiences only two diode voltage drops. While the single phase AC input in FIG. 3A is associated with a boost converter topology, the present disclosure also encompasses a buck converter topology or a buck-boost converter topology.

Figure 3B:
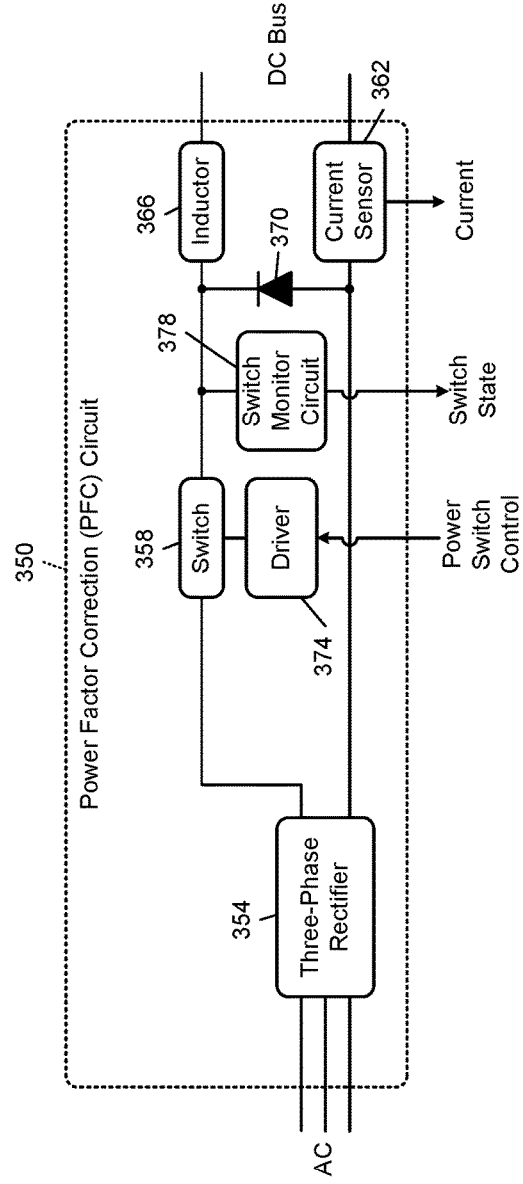
FIG. 3B is a block diagram of another example implementation of the PFC circuit of FIG. 2.

In FIG. 3B, a buck converter topology is shown with a three-phase AC input signal. Note that the principles of the present disclosure also apply to a boost converter or buck-boost converter topology used with a three-phase AC input. A PFC circuit 350 represents another implementation of the PFC circuit 212 of FIG. 2.

A three-phase rectifier 354 receives three-phase AC and generates pulsating DC across first and second terminals. A switch 358 is connected between the first terminal of the three-phase rectifier 354 and a common node. The common node is connected to an inductor 366 and a cathode of a power diode 370.

An anode of the power diode 370 is connected to a second terminal of the three-phase rectifier 354. An opposite terminal of the inductor 366 establishes one terminal of the DC bus, while the second output of the three-phase rectifier 354 establishes the other terminal of the DC bus. In the configuration shown in FIG. 3B, the switch 358, the inductor 366, and the diode 370 are configured in a buck topology.

A current sensor 362 is connected in series between the anode of the diode 370 and the DC bus. In other implementations, the current sensor 362 may be located in series with the inductor 366. In other implementations, the current sensor 362 may be located in series with the switch 358. In other implementations, the current sensor 362 may be located in series between the anode of the diode 370 and the second output of the three-phase rectifier 354. The current sensor 362 measures current through the inductor 366 as well as current through the DC bus and provides a current signal indicative of the amount of the current.

A driver 374 drives a control terminal of the switch 358 based on a power switch control signal from the control module 220 in FIG. 2. A switch monitor circuit 378 detects whether the switch 358 has opened or closed and reports the switch state to the control module 220. With the location of the current sensor 362, the current sensor 362 will measure approximately zero current when the switch 358 is open.

Figure 4:
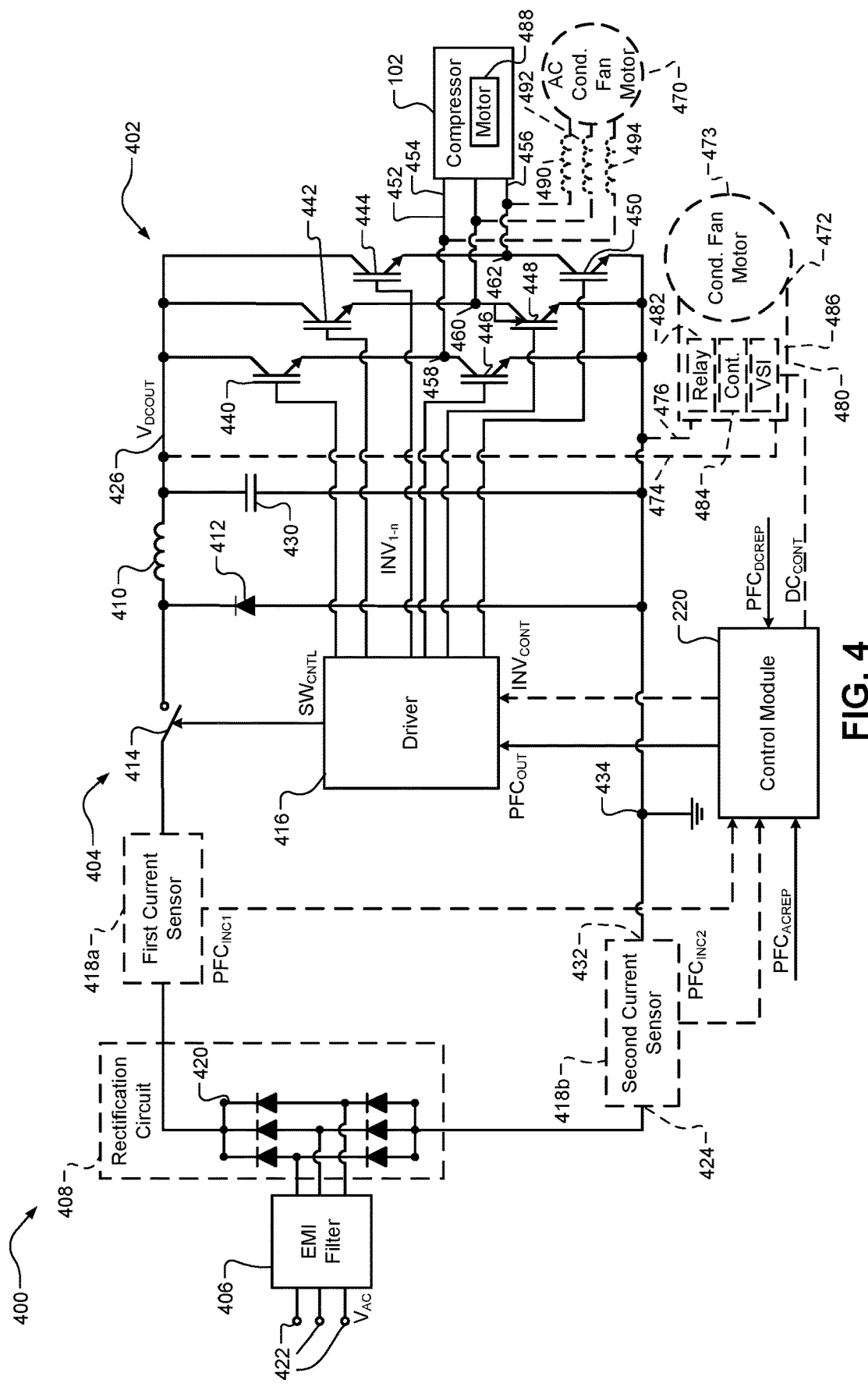
FIG. 4 is schematic and block diagram of an example of portions of a PFC circuit and an inverter power circuit of a multi-phase drive including a buck converter in accordance with an embodiment of the present disclosure.

Various voltages are described with respect to the following FIGS. 4-8; each of the voltages is of a corresponding voltage signal. FIG. 4 shows portions 400, 402 of a PFC circuit (e.g., the PFC circuit 212 of FIG. 2) and an inverter power circuit (e.g., the inverter power circuit 232 of FIG. 2) of a multi-phase drive (e.g., the drive 132 of FIG. 1) including a buck converter 404. The portions 400, 402 may collectively be referred to as a drive circuit.

The portion 400 includes an EMI filter 406, a rectification circuit 408, an inductor 410, a diode 412, a switch 414, a driver 416 and one or more current sensors 418a, 418b. The EMI filter 406 receives a 3-phase AC voltage $V_{AC}$ from a 3-phase AC input 422. The EMI filter 406 may be connected to the output of the bridge rectifier 420 or an output of the first current sensor 418a. The EMI filter 406 filters the 3-phase AC voltage $V_{AC}$. The rectification circuit 408 includes a bridge rectifier 420. The bridge rectifier 420 may include six diodes, as shown. The bridge rectifier 420 includes AC inputs, a return input and an output. The AC inputs of the bridge rectifier 420 receive a 3-phase AC voltage output from the EMI filter 406. The return inputs are connected to a same output 424 of the second current sensor 418b. The output of the bridge rectifier 420 is connected to the switch 414. An output voltage of the bridge rectifier 420 may be referred to as a main voltage. A DC output of the portion 400 is provided to a DC bus 426, which may refer to the DC bus connected between the PFC circuit 212 and the inverter power circuit 208 of FIG. 2.

The inductor 410, diode 412, switch 414 and driver 416 provide an example implementation of the buck converter 404. The buck converter 404 may be configured differently than shown. The buck converter 404 operates as voltage and power converter. The buck converter 404 reduces a first (or main) voltage provided to the buck converter 404 to a second voltage provided to the DC bus 426. In one embodiment, the driver 416 controls ON time, OFF time, duty cycle and/or frequency of the switch 414 to adjust the voltage on the DC bus 426. The driver 416 may transition the switch between ON and OFF states based on an average mode control with a predetermined frequency, a variable minimum off time of the switch 414, a peak voltage mode control, and/or other control mode of operation. The average mode control referring to adjusting a duty cycle of the switch 414 and cycling the switch at the predetermined frequency.

The peak voltage mode control includes adjusting a peak voltage. The buck converter 404 reduces a peak voltage out of the bridge rectifier 420. The buck converter 404 may step down voltage while stepping up current. The buck converter 404 may be (i) OFF (operating in an inactive mode and switch 414 is held in an open state) or ON and operating in a low activity mode and switching the switch 414 between ON and OFF states at a low frequency for rising and falling portions of rectified AC signal out of the bridge rectifier 420, or (ii) ON, operating in a high activity mode, and switching the switch 414 between ON and OFF states at a high frequency near peaks of the rectified AC signal out of the bridge rectifier 420. The operation of the buck converter 404 limits the DC output voltage $V_{DCOUT}$ at the DC bus 426 while reducing power losses of the buck converter 404. In one embodiment, the buck converter 404 may be turned ON (i.e. the switch 414 is closed) and maintained in the ON state, such that there is no switching loses. This may occur during light load conditions. A peak voltage of the DC output voltage $V_{DCOUT}$ is based on (i) an average voltage at an output of the switch 414 minus a minor voltage drop across the inductor 410, and (ii) a duty cycle of the switch and voltage received at the switch 414.

The inductor 410 is connected (i) at a first end, to the switch and a cathode of the diode 412, and (ii) at a second end, to the DC bus 426 and a capacitor 430. The inductor 410 operates as a choke and may be small (e.g., 80 micro-Henry (μH)). The diode 412 may be formed of, for example, silicon carbide SiC. The anode of the diode 412 is connected to an input 432 of the second current sensor 418b and a reference terminal 434 (e.g., a ground reference). The switch 414 is connected in series with the inductor 410 between (i) the output of the primary bridge rectifier 420 and/or the first current sensor 418a and (ii) the inductor 410.

The switch 414 may be a transistor, such as a super-junction field effect transistor (FET), a power metal oxide semiconductor field-effect transistor (MOSFET), and/or a super-junction MOSFET. The switch 414 may be configured to be oscillated between ON (e.g., closed) and OFF (e.g., open) states at a high frequency (e.g., greater than or equal to 200 kilo-hertz (kHz)). A first terminal of the switch 414 is connected to the output of the bridge rectifier 420 or an output of the first current sensor 418*a*. A second terminal of the switch 414 is connected to the inductor 410 and a cathode of the diode 412.

A control terminal of the switch 414 receives a control signal $SW_{CTRL}$ from the driver (or switch driving control circuit) 416. The driver 416 generates the control signal $SW_{CTRL}$ based on an output signal $PFC_{OUT}$ of the control module 220. The control module 220 generates the output signal $PFC_{OUT}$ and the inverter signals $INV_{OUT}$ based on: one or more current sense signal $PFC_{INC1}$, $PFC_{INC2}$ from the current sensors 418; an AC signal $PFC_{ACREF}$ representative of the AC voltage $V_{AC}$; and a DC signal $PFC_{DCREF}$ that is representative of the DC output voltage $V_{DCOUT}$. The current sense signal $PFC_{INC1}$ may be equal to and/or indicative of an amount of current (i) passing through the inductor 410, and/or (ii) passing through the PFC circuit. The current sense signal $PFC_{INC2}$ may be equal to and/or indicative of an amount of current (i) returning from the DC bus 426 to the second current sensor 418*b*, and/or (ii) passing through the PFC circuit. The AC signal $PFC_{ACREF}$ may be equal to and/or indicative of the AC voltage $V_{AC}$. The DC signal $PFC_{DCREF}$ may be equal to and/or indicative of the DC output voltage $V_{DCOUT}$.

The capacitor 430 may be connected between the DC bus 426 and the reference terminal 434. The capacitor 430 may be connected (i) at a first end, to the inductor 410 and the DC bus 426, and (ii) at a second end, to the input 432 of the second current sensor 418*b* and the reference terminal 434.

The control module 220, which is further described below with respect to FIG. 5, controls operation of the driver 416. This may include adjusting the duty cycle and/or frequency of the $SW_{CTRL}$. Operation of the driver 416 may also include generating an inverter control signal $INV_{CONT}$ to control generation of inverter outputs signals $INV_{1-n}$, which are generated by the driver 416, where n is the number of inverter output signals. In one embodiment, the inverter outputs signals $INV_{1-n}$ are generated by the control module 220. The inverter outputs signals $INV_{1-n}$ may control operation of switches 440, 442, 444, 446, 448, 450 of the portion 402 of the inverter power circuit for the compressor 102 and/or switches of another inverter for a condenser fan, as shown in FIG. 6. The switches 440, 442, 444, 446, 448, 450 collectively operate as an inverter. The switches 440, 446 are connected in series between the DC bus 426 and the reference terminal 434. The switches 442, 448 are connected in series between the DC bus 426 and the reference terminal 434. The switches 444, 450 are connected in series between the DC bus 426 and the reference terminal 434. Compressor power lines 452, 454, 456 are connected to respective terminals 458, 460, 462. The terminal 458 is connected to switches 440, 446. The terminal 460 is connected to switches 442, 448. The terminal 462 is connected to switches 444, 450.

The control module 220 may command a DC output voltage $V_{DCOUT}$ that is less than a peak voltage of the input voltage $V_{AC}$ and/or the output of the bridge rectifier 420 during a period when the DC output voltage $V_{DCOUT}$ is within a predetermined range. The predetermined range may be centered on the peak voltage of the input voltage $V_{AC}$ and/or the output of the bridge rectifier 420. The commanded voltages may be determined by the control module 220.

Since the buck converter 404 reduces the voltage provided to the DC bus 426, a low voltage condenser fan can be connected to the compressor power lines 452, 454, 456 or may be connected directly or indirectly to the DC bus 426 and reference terminal 434. As a first example embodiment, a 3-phase AC condenser fan motor 470 is connected to the compressor power lines 452, 454, 456 and receives power from the inverter. The 3-phase AC condenser fan motor 470 may be an induction motor, a permanent magnet motor, a single speed motor, a variable speed motor and/or other suitable motor. The 3-phase AC condenser fan motor 470 is configured to receive a predetermined peak voltage, such as 575 VAC, 480 VAC, 230 VAC, 208 VAC, or other AC voltage.

In another embodiment and as an alternative to using the 3-phase AC condenser fan motor 470, a condenser fan motor assembly 472 is connected to the DC bus 426 and the reference terminal 434 via lines 474, 476. The condenser fan motor assembly 472 includes a condenser fan motor 473 (e.g., a permanent magnet motor, an induction motor, a synchronous reluctance motor or other AC condenser fan motor) that may be a single speed or a variable speed motor. In one embodiment the condenser fan motor 473 is a switched reluctance motor that receives pulsed DC. The condenser fan motor assembly 472 is configured to receive a predetermined peak voltage, such as 810 VDC, 675 VDC, 300 VDC, or other DC voltage. The condenser fan motor assembly 472 may be directly connected to the DC bus 426 and the reference terminal 434 and may include a control circuit 480. The control circuit 480 may include a relay 482, a controller 484, a variable speed interface (VSI) 486 and/or other circuit components to transfer, adjust, and/or convert the received DC voltage signal from the DC bus 416. The predetermined peak voltage may be converted to AC via the control circuit 480 or may be pulsed by the control circuit 480 and provided to the condenser fan motor 473. Another example embodiment for indirectly connecting a condenser fan to the DC bus 426 and reference terminal 434 is described below with respect to FIG. 6. The control circuit 480 may adjust the voltage, peak voltage, frequency, and/or duty cycle of the voltage signal provided to the condenser fan motor 473.

In one embodiment, inductors 490, 492, 494 are connected respectively to the compressor power lines 452, 454, 456 and to power inputs of the AC condenser fan motor 470. The inductors 490, 492, 494 may be included, for example, to reduce peak voltages seen by the AC condenser fan motor 470. The inductors 490, 492, 494 may be included based on an insulation rating of the AC condenser fan motor 470.

The relay 482 when in an open state disables the condenser fan motor 472 and when in a closed state enables the condenser fan motor 472. The VSI 486 may receive a control signal CONT from the control module 220 to adjust speed of the condenser fan motor 472. The control circuit 480 may close the relay 482 and/or adjust voltage to the condenser fan motor 472 based on the control signal CONT. The controller 484 may convert the DC voltage (first DC voltage) received from the DC bus 426 to (i) another (or second) DC voltage, or (ii) to an AC voltage. Thus, the control circuit 480 and/or the controller 484 may include a transformer to convert the first DC voltage. The controller 484 may vary the second DC voltage, a pulsed frequency of the first DC voltage, a pulsed frequency of the second DC voltage, or the AC voltage provided to the condenser fan motor 473 based on the control signal CONT.

During operation, the buck converter 404 downconverts a received voltage (e.g., 575 VAC) out of the bridge rectifier 420 to the DC voltage (e.g., 480 VAC, 230 VAC, or 208 VAC) received by the DC bus 426. The reduced DC voltage may be (i) converted to AC via the inverter and supplied to the compressor 102 and the AC condenser fan motor 470, or (ii) provided to the condenser fan motor assembly 472. The inverter outputs pulse width modulated (PWM) signals on the compressor power lines 452, 454, 456 that are received by the compressor 102 and the AC condenser fan motor 470. In one embodiment, the buck converter 404 may operate such that the received voltage is not downconverted, where a peak voltage provided to the inverter is a same as a peak voltage supplied to the bridge rectifier 420.

In one embodiment, the motor 488 of the compressor 102 and the AC condenser fan motor 470 are variable speed motors. In an embodiment, the motor 488 is an induction motor or a permanent magnet motor and the AC condenser fan motor 470 is an induction motor. The number of poles of the AC condenser fan motor 470 may be higher than the number of poles of the motor 488. The higher pole count causes the AC condenser fan motor 470 to spin at a lower speed than a speed of the motor 488 of the compressor 102. In one embodiment, the number of poles of the AC condenser fan motor 470 is twice the number of poles of the motor 488 of the compressor 102. In one embodiment, the number of poles of the AC condenser fan motor 470 is three times the number of poles of the motor 488 of the compressor 102. In another embodiment, both of the motors 470, 488 are induction motors and the number of poles of the AC condenser fan motor 470 is greater than the number of poles of the motor 488.

For further defined structure of the modules of FIGS. 2-4 and 10 see below provided methods of FIGS. 11-12 and below provided definition for the term "module".

Figure 5:
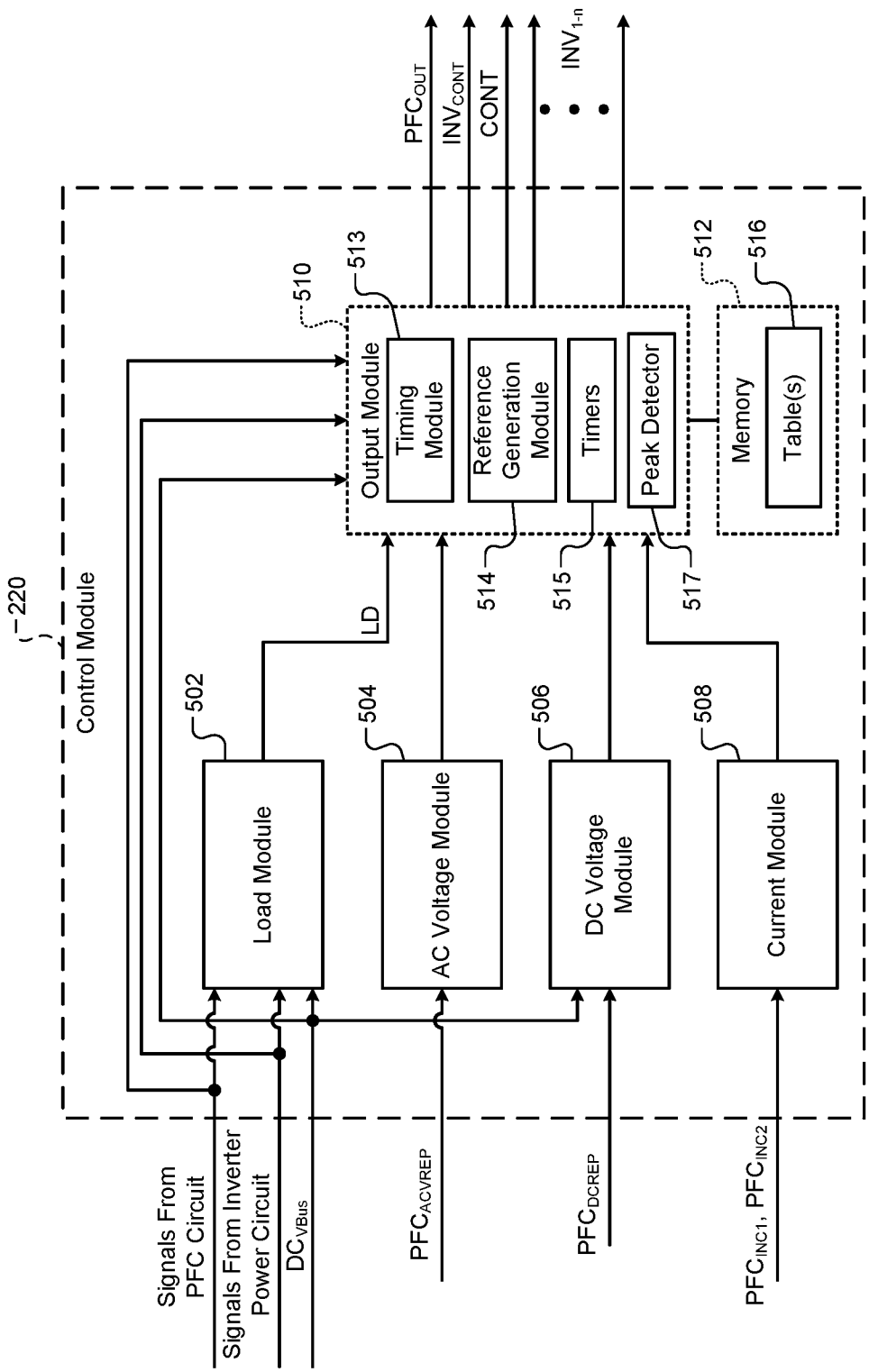
FIG. 5 is a functional block diagram of an example of a PFC switch control module in accordance with an embodiment of the present disclosure.
Figure 6:
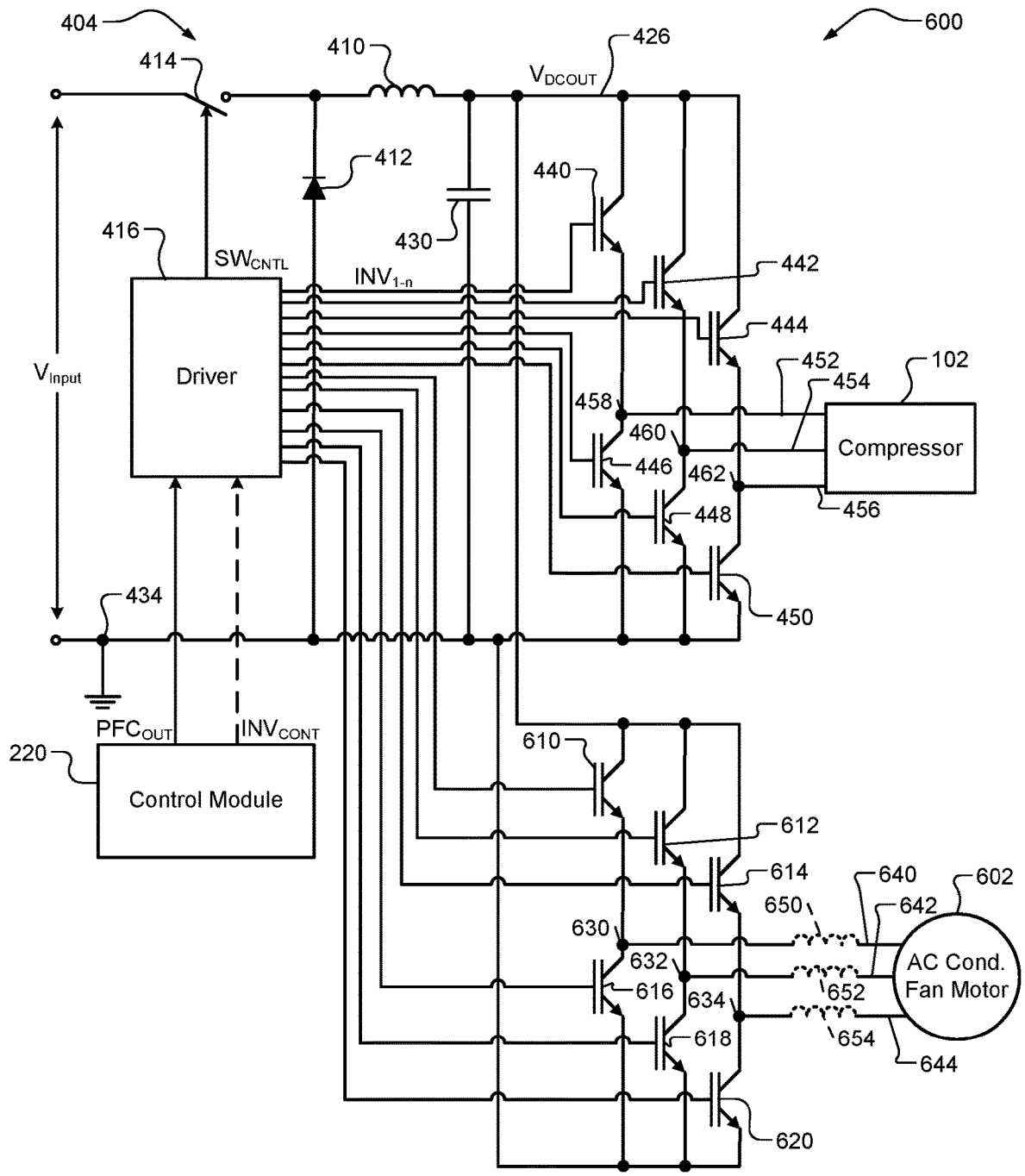
FIG. 6 is schematic and block diagram of an example of a portion of an inverter power circuit of a drive in accordance with another embodiment of the present disclosure.

FIG. 5 shows an example of the control module 220. The control module 220 may include a load module 502, an AC voltage module 504, a DC voltage module 506, a current module 508, an output module 510 and a memory 512. Although the modules 502, 504, 506, 508, 510 and the memory 512 are shown as part of the control module 220, one or more of the modules 502, 504, 506, 508, 510 and the memory 512 may be part of or also included in the system control module 270. The information (data, parameters, and signals) received and/or generated by the module 502, 504, 506, 508, 510 may be shared between the modules 502, 504, 506, 508, 510. The output module 510 may include a timing module 513, a reference generation module 514, timers 515 and/or a peak detector 517. The memory 512 may include one or more tables 516. Operation of the modules 502, 504, 506, 508, 510 and memory 512 are further described below with respect to the method of FIG. 8.

The output module 510 may operate in an active mode, an inactive mode, a low activity mode, a high activity mode, a full PFC mode, and a partial PFC mode. In an embodiment, frequency of oscillated operation of the switch 414 is decreased rather than deactivated. The frequency may be decreased to less than, for example, 200 kHz during low activity periods (or low activity mode). Timing of the low activity periods may be the same or similar to that of inactive periods. As an example, the frequency during the low activity periods may be an order of magnitude less than during the active periods (or active mode). As such, operation of the switch 414 may be transitioned between low activity modes and high activity modes rather than between inactive modes and active modes.

The full PFC mode may refer to when the buck converter 404 is continuously in an active or high activity mode to buck (or decrease) the DC bus voltage to match a commanded DC voltage $V_{DCCOM}$. The partial PFC mode refers to switching between operating in (i) an active or high activity mode and (ii) an inactive or low activity mode.

In one embodiment, the timing module 513 switches from operating in the full PFC mode to operating in the partial PFC mode. The partial PFC mode reduces power losses by operating at reduced DC voltages and provides improved operating efficiency. The timing module 513 may, for example, operate in the partial PFC mode during light compressor loading conditions (e.g., load on compressor less than a predetermined load) and operate in the full PFC mode during heavy compressor loading conditions (e.g., load on compressor greater than or equal to the predetermined load). During the light load conditions, frequency of the switch 414 is decreased since the amount of current through the inductor 410 is low. As the current through the inductor 410 increases for increased load, the switch 414 may be pulse width modulated at a higher frequency to further decrease the bus voltage. This prevents overheating the inverter power circuit 232 of FIG. 2 during heavy load conditions.

The output module 510 generates signals $PFC_{OUT}$ and $INV_{1-n}$ based on outputs of the module 502, 504, 506, 608. In one embodiment, the inverter signals $INV_{1-n}$ include the inverter signals provided to the inverter of the compressor 102. In an alternative embodiment, the inverter signals $INV_{1-n}$ include the inverter signals provided to the compressor 102 and to an inverter of an AC condenser motor. This alternative embodiment is shown in FIG. 6. Speeds of the motor of the compressor 102 and of the AC condenser fan motor 470 may be adjusted by adjusting: a duty cycle of the switch 414 and thus the DC voltage on the DC bus 426; and switching frequencies of the switches 440, 442, 444, 446, 448, 450. Adjusting the DC voltage on the DC bus 426 and the switching frequencies of the switches 440, 442, 444, 446, 448, 450 adjusts the voltage to frequency ratios of the compressor power lines 452, 454, 456, which adjusts the speeds of the motors 470, 488.

FIG. 6 shows a portion 600 of an inverter power circuit (e.g., the inverter power circuit 232 of FIG. 2) including a first inverter for the compressor 102 and a second inverter for an AC condenser fan motor 602. The portion 600 includes the buck converter 404. The buck converter 404 includes the inductor 410, diode 412, switch 414, driver 416, and capacitor 430. The inverter includes the switches 440, 442, 444, 446, 448, 450. The driver 416 generates the switch control signal $SW_{CTRL}$ based on the signal $PFC_{OUT}$. The driver 416 also generates inverter output signals $INV_{1-n}$ which may be generated based on the control signal $INV_{CONT}$ from the control module 220, where n is the number of inverter control signals. Some of the inverter output signals $INV_{1-n}$ are provided to the inverter of the AC condenser fan motor 602.

The inverter of the AC condenser fan motor 602 is provided by switches 610, 612, 614, 616, 618, 620. The switches 610, 612, 614, 616, 618, 620 are connected similar as the switches 440, 442, 444, 446, 448, 450 and to the DC bus 426 and reference terminal 434.

The AC condenser fan motor 602 is connected to and receives power from output terminals 630, 632, 634 via power lines 640, 642, 644. The output terminals 630, 632, 634 are connected respectively to (i) switches 610, 616, (ii) switches 612, 618, and (iii) switches 614, 620. In one embodiment, inductors 650, 652, 654 are connected to the output terminals 630, 632, 634 and inputs of the AC condenser fan motor 602 to reduce peak voltages seen by the AC condenser fan motor 602.

Although the example implementation of FIG. 6 is for a 3-phase condenser fan motor, the implementation may be modified for a single phase condenser fan motor. For example, a single phase AC fan condenser motor may be connected via a respective inverter to DC bus 726 and reference terminal 734 of FIG. 7.

Figure 7:
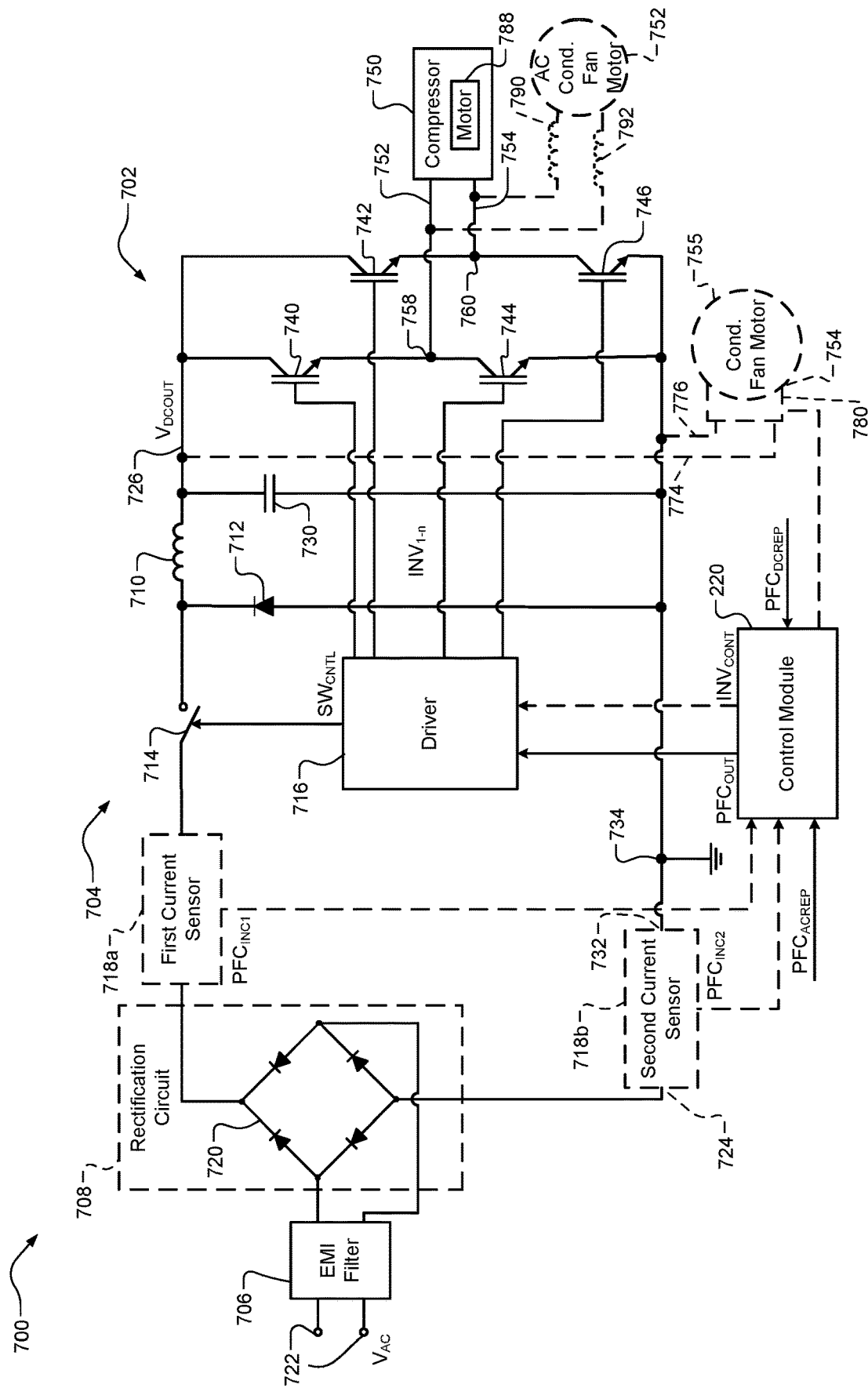
FIG. 7 is a schematic and block diagram of an example of portions of a PFC circuit and an inverter power circuit of a single-phase drive including a buck converter in accordance with an embodiment of the present disclosure.

FIG. 7 shows an example of portions 700, 702 of respectively a PFC circuit (e.g., the PFC circuit 212 of FIG. 2) and an inverter power circuit (e.g., the inverter power circuit 232 of FIG. 2) of a single-phase drive including a buck converter 704. The portions 700, 702 are configured similarly as the portions 400, 402 of FIG. 4. The portions 700, 702 may collectively be referred to as a drive circuit. The buck converter 704 may operate similarly as the buck converter 404 of FIG. 4.

The portion 700 includes an EMI filter 706, a rectification circuit 708, an inductor 710, a diode 712, a switch 714, a driver 716 and one or more current sensors 718a, 718b. The EMI filter 706 receives a single phase AC voltage $V_{AC}$ from a single phase AC input 722. The EMI filter 706 may be connected to the output of the bridge rectifier 720 or an output of the first current sensor 718a. The EMI filter 706 filters the single phase AC voltage $V_{AC}$. The rectification circuit 708 includes a bridge rectifier 720. The bridge rectifier 720 may include four diodes, as shown. The bridge rectifier 720 includes AC inputs, a return input and an output. The AC inputs of the bridge rectifier 720 receive a single phase AC voltage output from the EMI filter 706. The return inputs are connected to a same output 724 of the second current sensor 718b. The output of the bridge rectifier 720 is connected to the switch 714. An output voltage of the bridge rectifier 720 may be referred to as a main voltage. A DC output of the portion 700 is provided to a DC bus 726, which may refer to the DC bus connected between the PFC circuit 212 and the inverter power circuit 208 of FIG. 2.

The inductor 710, diode 712, switch 714 and driver 716 provide an example implementation of the buck converter 704. The buck converter 704 may be configured differently than shown. The buck converter 704 operates as voltage and power converter. The buck converter 704 reduces a first (or main) voltage provided to the buck converter 704 to a second voltage provided to the DC bus 726. In one embodiment, the driver 716 controls ON time, OFF time, duty cycle and/or frequency of the switch 714 to adjust the voltage on the DC bus 726. The driver 716 may transition the switch between ON and OFF states based on an average mode control with a predetermined frequency, a variable minimum off time of the switch 714, a peak voltage mode control, and/or other control mode of operation. The average mode control referring to adjusting a duty cycle of the switch 714 and cycling the switch at the predetermined frequency.

The peak voltage mode control includes adjusting a peak voltage. The buck converter 704 reduces a peak voltage out of the bridge rectifier 720. The buck converter 704 may step down voltage while stepping up current. The buck converter 404 may be (i) OFF (operating in an inactive mode and switch 714 is held in an open state) or ON and switching the switch 714 between ON and OFF states at a low frequency for rising and falling portions of rectified AC signal out of the bridge rectifier 720, or (ii) ON, operating in a high activity mode, and switching the switch 714 between ON and OFF states at a high frequency near peaks of the rectified AC signal out of the bridge rectifier 720. The operation of the buck converter 704 limits the DC output voltage $V_{DCOUT}$ at the DC bus 726 while reducing power losses of the buck converter 704. In one embodiment, the buck converter 704 may be turned ON (i.e. the switch 714 is closed) and maintained in the ON state, such that there is no switching loses. This may occur during light load conditions.

The inductor 710 is connected (i) at a first end, to the switch and a cathode of the diode 712, and (ii) at a second end, to the DC bus 726 and a capacitor 730. The inductor 710 operates as a choke and may be small (e.g., 80 micro-Henry (μH)). The diode 712 may be formed of, for example, silicon carbide SiC. The anode of the diode 712 is connected to an input 732 of the second current sensor 718b and a reference terminal 734 (e.g., a ground reference). The switch 714 is connected in series with the inductor 710 between (i) the output of the primary bridge rectifier 720 and/or the first current sensor 718a and (ii) the inductor 710.

The switch 714 may be a transistor, such as a super-junction FET, a MOSFET, and/or a super-junction MOSFET. The switch 714 may be configured to be oscillated between ON (e.g., closed) and OFF (e.g., open) states at a high frequency (e.g., greater than or equal to 200 kilo-hertz (kHz)). A first terminal of the switch 714 is connected to the output of the bridge rectifier 720 or an output of the first current sensor 718a. A second terminal of the switch 714 is connected to the inductor 710 and a cathode of the diode 712.

A control terminal of the switch 714 receives a control signal $SW_{CTRL}$ from the driver (or switch driving control circuit) 716. The driver 716 generates the control signal $SW_{CTRL}$ based on an output signal $PFC_{OUT}$ of the control module 220. The control module 220 generates the output signal $PFC_{OUT}$ and the inverter control signal $INV_{CONT}$ based on: one or more current sense signal $PFC_{INC1}$, $PFC_{INC2}$ from the current sensors 718; an AC signal $PFC_{ACREF}$ representative of the AC voltage $V_{AC}$; and a DC signal $PFC_{DCREF}$ that is representative of the DC output voltage $V_{DCOUT}$. The current sense signal $PFC_{INC1}$ may be equal to and/or indicative of an amount of current (i) passing through the inductor 710, and/or (ii) passing through the PFC circuit. The current sense signal $PFC_{INC2}$ may be equal to and/or indicative of an amount of current (i) returning from the DC bus 726 to the second current sensor 718b, and/or (ii) passing through the PFC circuit. The AC signal $PFC_{ACREF}$ may be equal to and/or indicative of the AC voltage $V_{AC}$. The DC signal $PFC_{DCREF}$ may be equal to and/or indicative of the DC output voltage $V_{DCOUT}$.

The capacitor 730 may be connected between the DC bus 726 and the reference terminal 734. The capacitor 730 may be connected (i) at a first end, to the inductor 710 and the DC bus 726, and (ii) at a second end, to the input 732 of the second current sensor 718b and the reference terminal 734.

The control module 220, which is further described above with respect to FIG. 5, controls operation of the driver 716. This may include adjusting the duty cycle and/or frequency of the $SW_{CTRL}$. This may also include generating an inverter control signal $INV_{CONT}$ to control generation of inverter outputs signals $INV_{1-n}$ which are generated by the driver 716. In one embodiment, the inverter outputs signals $INV_{1-n}$ are generated by the control module 220. The inverter outputs signals $INV_{1-n}$ may control operation of switches 740, 742, 744, 746 of the portion 702 of the inverter power circuit for a compressor 750 and/or switches of another inverter for a condenser fan. The switches 740, 742, 744, 746 collectively operate as an inverter. The switches 740, 744 are connected in series between the DC bus 726 and the reference terminal 734. The switches 742, 746 are connected in series between the DC bus 726 and the reference terminal 734. Compressor power lines 752, 754 are connected to respective terminals 758, 760. The terminal 758 is connected to switches 740, 744. The terminal 760 is connected to switches 742, 746.

The control module 220 may command a DC output voltage $V_{DCOUT}$ that is less than a peak voltage of the input voltage $V_{AC}$ and/or the output of the bridge rectifier 720 during a period when the DC output voltage $V_{DCOUT}$ is within a predetermined range. The predetermined range may be centered on the peak voltage of the input voltage $V_{AC}$ and/or the output of the bridge rectifier 720. The commanded voltages may be determined by the control module 220.

Since the buck converter 704 reduces the voltage provided to the DC bus 726, a low voltage condenser fan can be connected to the compressor power lines 752, 754 or may be connected directly or indirectly to the DC bus 726 and reference terminal 734. As a first example embodiment, the single phase AC condenser fan motor 750 is connected to the compressor power lines 752, 754 and receives power from the inverter. The single phase AC condenser fan motor 752 may be an induction motor, a permanent magnet motor, a single speed motor, a variable speed motor and/or other suitable motor. The single phase AC condenser fan motor 752 is configured to receive a predetermined peak voltage, such as 575 VAC, 480 VAC, 230 VAC, 208 VAC, or other AC voltage.

In another embodiment and as an alternative to using the single phase AC condenser fan motor 752, a condenser fan motor assembly 754 is connected to the DC bus 726 and the reference terminal 734 via lines 774, 776. The condenser fan motor assembly 754 may be directly connected to the DC bus 726 and the reference terminal 734 and/or may include a control circuit 780, which may be configured similar to the control circuit 480 of FIG. 4. The condenser fan motor assembly 754 includes a condenser fan motor 755, which may be a single speed or a variable speed motor. The condenser fan motor assembly 754 is configured to receive a predetermined peak voltage, such as 810 VDC, 675 VDC, 300 VDC, or other DC voltage. The predetermined peak voltage may be provided to the condenser fan motor 755 or may be adjusted and/or converted by a controller of the control circuit 755 and then provided to the condenser fan motor 755. The control circuit 780 may include a relay, a controller, and/or a VSI. Another example embodiment for indirect connecting of a condenser fan to the DC bus 726 and reference terminal 734 is described above with respect to FIG. 6.

In one embodiment, inductors 790, 792 are connected respectively to the compressor power lines 752, 754 and to power inputs of the AC condenser fan motor 752. The inductors 790, 792 may be included, for example, to reduce peak voltages seen by the AC condenser fan motor 752. The inductors 790, 792 may be included based on an insulation rating of the AC condenser fan motor 752.

In one embodiment, the compressor 750 and the AC condenser fan motor 752 are variable speed devices. The number of poles of AC condenser fan motor 752 may be higher than the number of poles of a motor 788 of the compressor 750. The higher pole count causes the AC condenser fan motor 752 to spin at a lower speed than a speed of the motor 788 of the compressor 750. In one embodiment, the number of poles of the AC condenser fan motor 752 is twice the number of poles of the motor of the compressor 750.

For further defined structure of the modules of FIGS. 2-7 see below provided method of FIG. 8 and below provided definition for the term "module".

Figure 8:
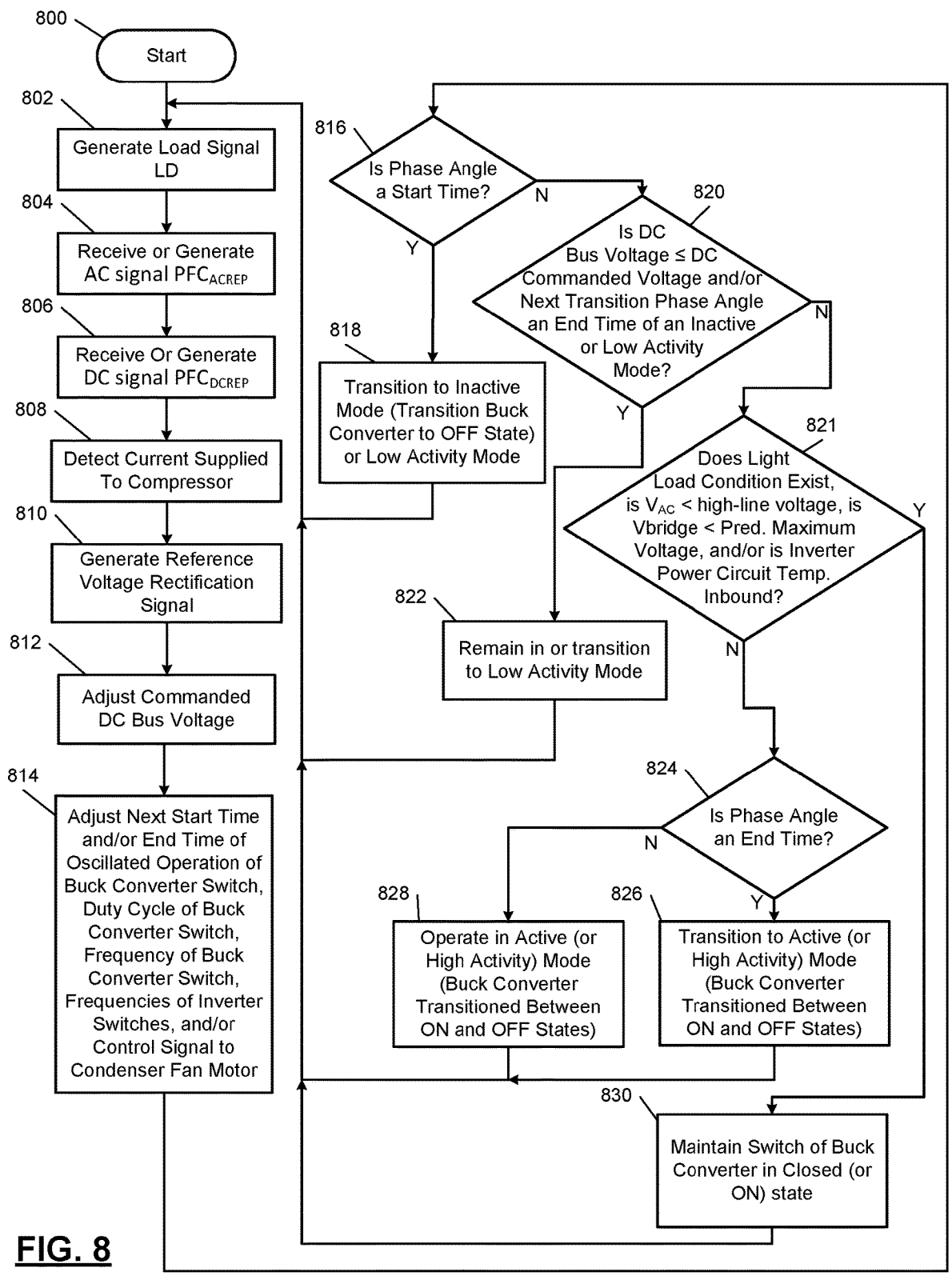
FIG. 8 is a flow diagram illustrating an example method of operating the multi-phase drive of FIG. 4 in accordance with an embodiment of the present disclosure.

The systems disclosed herein may be operated using numerous methods, an example methods is illustrated in FIG. 8. In FIG. 8, a method of operating a multi-phase drive (e.g., the multi-phase drive of FIG. 4) is shown. Although the following tasks are primarily described with respect to the implementations of FIGS. 4-6, the tasks may be easily modified to apply to other implementations of the present disclosure including the single phase implementation of FIG. 7. The tasks may be iteratively performed.

The method may begin at 800. At 802, the load module 502 may receive various signals and parameters from (i) the PFC circuit 212 of FIG. 2 including signals and parameters from the drive circuit of FIG. 4, and (ii) the inverter power circuit 208 of FIG. 2. The signals and parameters may include a voltage $DC_{DCOUT}$ of the DC bus 426 between the PFC circuit 212 and the inverter power circuit 208. At least some of the signals and parameters are disclosed in and described with respect to FIG. 2. The signals and parameters may include DC signals and/or measured DC voltages corresponding to DC voltages on the DC bus, amounts of current supplied to the compressor (e.g., one of the compressors 102, 750), voltages of power supplied to the compressor, sensor input data, commanded and/or manually entered parameters, and/or other shared data and parameters. The load module 502 may generate a load signal LD that is indicative of a load on the compressor based on the stated signals and parameters. The load signal LD may be generated based on a load algorithm, one or more maps, one or more equations, one or more tables (e.g., one or more of the tables 516), predetermined (or historical) data, and/or predicted (or estimated) future data. The load algorithm, maps, equations and/or tables may relate the signals and parameters to provide a calculated load and/or value indicative of the load on the compressor.

At 804, the AC voltage module 504 may receive or generate the AC signal $PFC_{ACREP}$. The AC voltage module 504 may detect voltages at the output of the bridge rectifier 420. The AC signal $PFC_{ACREP}$ may be set equal to and/or be representative of one or more of the output of the bridge rectifier 420.

At 806, the DC voltage module 506 may receive or generate the DC signal $PFC_{DCREP}$. The DC voltage module 506 may (i) detect the voltage $DC_{DCout}$ at the DC bus between the PFC circuit 212 and the inverter power circuit 208, and/or (ii) receive a DC bus voltage indication signal from a sensor and/or module external to the control module 220 and/or the DC voltage module 506.

At 808, the current module 508 may determine an amount of current supplied to the compressor and/or passing through one or more of the current sensors 418. This may be based on the current sense signals $PFC_{INC1}$, $PFC_{INC2}$.

At 810, the reference generation module 514 may generate a reference sinusoidal signal and/or a reference rectified sinusoidal signal. The references signals may be generated based on the AC input signal $V_{AC}$, an output of the EMI filter 406, and/or the output of the bridge rectifier 420. In one embodiment, the reference signals are generated based on the output of the EMI filter 406 or the output of the bridge rectifier 420. This may include estimating the phase of the output of the EMI filter 406 or the output of the bridge rectifier 420. The AC input signal $V_{AC}$, the output of the bridge rectifier 420 and/or the output of the EMI filter 406 may have noise or irregular activity as not to be perfect sinusoidal and/or rectified sinusoidal waves. The reference generation module 514 generates the reference signals to be pure sinusoidal and/or rectified sinusoidal reference signals having the same phase as the AC input signal $V_{AC}$, the output of the bridge rectifier 420 and/or the output of the EMI filter 406. This synchronizes the reference signals to the AC input signal $V_{AC}$, the output of the bridge rectifier 402 and/or the output of the EMI filter 406. The reference generation module 514 may output reference data including phase, frequency, period, and/or other time-varying derivative (or gradient) of the reference signals. The reference data may include scaled versions of the reference signals.

At 812, the timing module 513 may generate the commanded DC voltage $V_{DCCOM}$ to be less than a peak (or maximum) AC input voltage $V_{AC}$ and/or a peak (or maximum) output voltage of the bridge rectifier 420. This is unlike traditional PFC circuits, which always have the commanded DC voltages above a peak AC input voltage. The commanded DC voltage $V_{DCCOM}$ may be set to be within a predetermined range of the peak output voltage of the bridge rectifier 420. As an example, as the load on the compressor increases, the commanded DC voltage $V_{DCCOM}$ may be decreased. By lowering the commanded DC voltage $V_{DCCOM}$, the amount of time between end times and successive start times (or times between active modes and following inactive modes) of oscillated switch control operation increases. This allows the DC output voltage $V_{DCOUT}$ to increase during inactive periods to a higher peak voltage. Mode transition points refer to transitions between (i) the active (and/or high activity) mode (oscillated switch operation enabled) and (ii) the low activity mode. Examples of mode transition points are shown as cross-over points in FIG. 5, however the mode transition points may not match corresponding cross-over points depending on the start times and end times (i.e. phase angles) of the mode transition points. As another example, by increasing the commanded DC voltage $V_{DCCOM}$ relative to the peak voltage of $V_{AC}$ and/or output of the bridge rectifier 420, periods when oscillated operation of the switch 414 are decreased in length. A small change in the commanded DC voltage $V_{DCCOM}$ can make a large difference in peak current supplied.

At 814, the timing module 513 may adjust: next start times and/or end times of the oscillated operation of the switch 414; duty cycle of the oscillated operation of the switch 414; frequency of the oscillated operation of the switch 414; frequency of inverter switches (e.g., the switches 442, 444, 446, 448, 450, 610, 612, 614, 616, 618, 620, 740, 742, 744, 746, and/or the control signal $DC_{CONT}$. This may include adjusting times of rising and/or falling edges of the control signal $SW_{CTRL}$. The stated adjustments may be performed to adjust a speed of one of the motors 470, 472, 602, 752, 754. The stated adjustment(s) may be based on the load of the compressor determined at 802, the AC voltage received and/or detected at 804, the DC voltage received and/or generated at 606, one or more of the current levels detected at 808, and/or one or more of the reference signals generated at 810. The adjustments may also be based on capacitance of the DC bus, torque commanded of the compressor, predicted voltages of the output of the bridge rectifier 420, and/or other parameters associated with operation of the drive circuit. The adjustments may advance or delay the transition start times and/or the transition end times. The adjustments may be determined based on equations, algorithms, maps, and/or tables relating the stated parameters, which may be stored in the memory 512 and accessed by the timing module 513. The adjustments may also be based on previous (historical) values and/or results, which may also be stored in and accessed from the memory 512. For example, if a last peak DC bus voltage or peak detected current (current detected by one of the current sensors 418*a*, 418*b*) was above a predetermined threshold, than the next transition end time or transition start time may be advanced to reduce the peak DC bus voltage and/or peak detected current.

At 816, the timing module 513 determines whether the phase angle of the output of the bridge rectifier 420 matches a predetermined start time of an active period. In addition or alternatively, voltages of the output of the bridge rectifier 420 (or input to switch 414) and/or the output of the buck converter 404 (or output of the inductor 410) may be compared to predetermined voltages for the predetermined start time to determine whether the stated condition exists. If there is a match, task 818 is performed, otherwise task 620 is performed.

At 818, the timing module 513 transitions to the inactive mode or low activity mode. If the timing module 513 transitions to the inactive mode, then the buck converter 404 is transitioned to an OFF state and the switch 414 is switched to an open state. If the timing module 513 transitions to the low activity mode, then oscillated operation of the switch 414 continues, but at a reduced frequency and/or at a reduced duty cycle, such that OFF times of the switch 414 are increased and/or ON times of the switch 414 are decreased. Task 802 may be performed subsequent to task 818.

At 820, the timing module 513 may determine whether the DC bus voltage is less than or equal to the commanded DC voltage $VD_{CCOM}$ and/or whether a next transition phase angle (next phase angle at which point a transition between operating modes occurs) is an end time (e.g., one of the end times *e*1-*e*6 of FIGS. 5-6) for an inactive mode and/or low activity mode. In addition or alternatively, voltages of the output of the bridge rectifier 420 and/or the buck converter 404 may be compared to predetermined voltages for the predetermined end time to determine whether one or more of the stated conditions exist. The timing module 513 may also or alternatively determine whether the current transition phase angle is within a predetermined range (e.g., between a last start time and a subsequent end time) of a current inactive mode or low activity mode. In addition or alternatively, voltages of the output of the bridge rectifier 420 and/or the buck converter 404 may be compared to predetermined voltages for the predetermined range to determine whether the stated condition exists. At the end time, the timing module 513 transitions from an inactive mode or low activity mode to an active and/or high activity mode. If the DC bus voltage is less than or equal to the commanded DC voltage $V_{DCCOM}$ and/or the next transition phase angle is at an end time for an inactive mode or low activity mode, then task 822 is performed, otherwise task 821 is performed.

At 821, the timing module 513 determines whether (i) a light load condition exists, (ii) $V_{AC}$ is less than a "high-line" voltage (is at or near a maximum operating voltage) and/or voltage out of the bridge 420 (or Vbridge) is less than a predetermined maximum voltage, and/or (iii) if temperature of the inverter power circuit 232 is inbound (i.e. within a predetermined temperature range). By checking if $V_{AC}$ is less than the "high-line" voltage and/or output of the bridge 420. Vbridge is less than the predetermined maximum voltage, the system prevents stress on the inverter power circuit 232 of FIG. 2. If a light load condition exists, $V_{AC}$ is less than a "high-line" voltage, Vbridge is less than a predetermined maximum voltage, and/or the temperature of the inverter power circuit 232 is inbound, then task 830 is performed, otherwise task 824 is performed. In one embodiment, when (i) a light load condition exists, (ii) $V_{AC}$ is less than a "high-line" voltage and/or Vbridge is less than a predetermined maximum voltage, and (iii) the temperature of the inverter power circuit 232 is inbound, task 830 is performed, otherwise task 824 is performed.

At 822, the timing module 513 remains in or transition to the low activity mode. Task 802 may be performed subsequent to task 822. At 824, the timing module 513 determines whether the phase angle is an end time of an active mode and/or a high activity mode. In addition or alternatively, a voltage of the output of the bridge rectifier 420 and/or the buck converter 404 may be compared to predetermined voltages for the end time to determine whether the stated condition exists. If the phase angle is an end time, task 826 is performed, otherwise task 828 is performed.

At 826, the timing module 513 transitions to the active (or high activity) mode. This includes oscillated operation of the switch 414 at a first (or high) frequency. The duty cycle of the switch 808, including durations of ON times and OFF times, may correspond to duty cycle information determined at 814. Task 802 may be performed subsequent to task 826. At 828, the timing module 513 operates in the active mode or high activity mode. Task 802 may be performed subsequent to task 828.

At 830, the switch 414 is held in a closed (or ON) state and is not switched between states. When the switch is ON, the portion 400 performs as a 3-phase rectifier with a DC choke. Thus, no switching occurs when $V_{AC}$ is at a nominal or low-line voltage. Task 802 may be performed subsequent to task 830.

When $V_{AC}$ is too high, switching of the switch 414 (or bucking) occurs to decrease the bus voltage $V_{DCOUT}$. As the load increases, the bus voltage $V_{DCOUT}$ is decreased, the amount of current through the inductor 410 increases and the control module 220 begins bucking by pulse width modulating the switch 414 to lower the bus voltage $V_{DCOUT}$ (e.g., at tasks 826, 828) to a selected command voltage. The control module 220 may shape the current by adjusting the duty cycle of $SW_{CTRL}$ during this period for PFC operation. This may include providing a flat (or constant) amount of current through the choke or a profiled current shape. The ability to buck during certain conditions and not to buck during other conditions is referred to as "partial buck" operation.

During the light load condition, the switch 414 may be switched at a low frequency since the amount of current through the inductor 410 is low. As the current through the inductor 410 increases for increased load, the frequency of the switch 414 may be increased to decrease the bus voltage. This prevents overheating the inverter power circuit 232 of FIG. 2 during heavy load conditions.

Although the above tasks 816-830 are provided in a particular order, tasks 816-830 may be performed in a different order. As an example, task 821, 824, 826, 828 may be performed prior to tasks 816, 818, 820 and 822. If task 821, 824, 826, 828 are performed prior to tasks 816, 818, 820 and 822, then task 820 may be modified to determine whether the DC bus voltage is greater than or equal to the commanded voltage, the next transition phase angle is a start time of an active mode and/or high activity mode, and/or the current phase angle is within a predetermined range (e.g., between an end time of an inactive mode or a low activity mode and a subsequent start time of the inactive mode or low activity mode). This may include comparing a voltage of the outputs of the bridge rectifier 420 and/or the buck converter 404 to corresponding predetermined voltages and ranges to effectively determine if the next transition phase angle is a start time of an active mode and/or high activity mode, and/or the current phase angle is within a predetermined range.

The above-described operations of FIG. 8 are meant to be illustrative examples; the tasks may be performed sequentially, synchronously, continuously, during overlapping time periods or in a different order depending upon the application. Also, any of the tasks may not be performed or skipped depending on the implementation and/or sequence of events.

The peak voltages for the condenser fan motors described above are not higher than and may be lower than peak voltages seen at the mains and/or voltages received by the buck converters. Levels of the peak voltages seen by the condenser fan motors can be adjusted by controlling the buck converters to adjust the DC voltage on the DC buses. Inclusion of a buck converter is less expensive than inclusion of a transformer for high-to-low voltage conversion. To adjust the speeds of the condenser motors, the DC bus voltages may be adjusted, frequencies of inverter switches may be adjusted, and/or control signals to condenser fan motor assemblies may be adjusted.

In one embodiment, a high AC voltage (e.g., 575 VAC or 600 VAC) is downconverted by a buck converter to a low DC voltage (e.g., 675 VDC or 300 VDC), which is provided to an inverter that outputs a low AC voltage (e.g., 480 VAC or 230 VAC). This allows for a low voltage inverter and low voltage condenser fan motor. In one embodiment, the condenser fan motor is an induction motor and the condenser fan motor is "slaved" to a compressor, such that the power inputs of the condenser are connected to power lines of the compressor. The condenser fan motor may run at the same stator frequency as the compressor. The speed of the condenser fan motor is related to the speed of the compressor. In this example, the number of poles of the condenser fan motor is greater than the number of poles of the compressor. Since the buck output voltages and the peak voltages supplied to the condenser fan motor are reduced, insulation phase-to-phase and winding to ground ratings of the condenser fan motor are reduced and rated for the peak voltages.

In another embodiment, the speed of the condenser fan motor is adjusted by adjusting PWM of the corresponding inverter. The PWM adjustment is controlled to maintain the output voltage of the inverter below or equal to a predetermined voltage (e.g., 230 VAC).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:
1. A drive circuit comprising:
a rectification circuit configured to rectify a first alternating current (AC) voltage signal to generate a rectified voltage signal;
a buck converter configured to downconvert the rectified voltage signal to a direct current (DC) voltage signal, wherein the DC voltage signal is supplied to a DC bus;

a first inverter configured to convert the DC voltage signal to a second AC voltage signal and supply the second AC voltage signal to a compressor motor; and a second inverter configured to convert the DC voltage signal to a third AC voltage signal and supply the third AC voltage signal to a condenser fan motor, wherein peak voltages of the second AC voltage signal and the third AC voltage signal are less than peak voltages of the first AC voltage signal.

2. The drive circuit of claim 1, wherein:
the buck converter comprises
  a switch, and
  a driver configured to transition the switch between an open state and a closed state;
a peak voltage of the DC voltage signal is based on an average voltage at an output of the switch; and
the driver is configured to reduce a DC voltage of the DC voltage signal by adjusting a duty cycle of the switch.

3. The drive circuit of claim 1, further comprising an inductor connected in series between an output of the second inverter and an input of the condenser fan motor.

4. The drive circuit of claim 1, wherein a speed of the condenser fan motor is independent of a speed of the compressor motor.

5. The drive circuit of claim 1, further comprising a control module, wherein:
the buck converter comprises a switch and a driver;
the driver is configured to receive a first control signal from the control module and control a state of the switch based on the first control signal;
the first inverter and the second inverter are configured to receive a plurality of control signals from the driver or the control module; and
the control module is separate from the driver.

6. The drive circuit of claim 5, wherein the driver is configured to receive a second control signal from the control module and provide the plurality of control signals to the first inverter and the second inverter based on the second control signal.

7. The drive circuit of claim 5, wherein the control module is configured to provide the plurality of control signals to the first inverter and the second inverter.

8. A drive circuit comprising:
a rectification circuit configured to rectify a first alternating current (AC) voltage signal to generate a rectified voltage signal;
a buck converter configured to downconvert the rectified voltage signal to a first direct current (DC) voltage signal, wherein the first DC voltage signal is supplied to a DC bus;
a first inverter configured to convert the first DC voltage signal to a second AC voltage signal and supply the second AC voltage signal to a compressor motor; and
a condenser fan motor assembly configured to receive the first DC voltage signal and one of
  convert the first DC voltage signal to a third AC voltage signal and supply the third AC voltage signal to a condenser fan motor,
  pulse the first DC voltage signal and supply the pulsed first DC voltage signal to the condenser fan motor, and
  convert the first DC voltage signal to a second DC voltage signal and supply a pulsed version of the second DC voltage signal to the condenser fan motor.

9. The drive circuit of claim 8, wherein:
the condenser fan motor assembly comprises a control circuit; and
the control circuit is configured to convert the first DC voltage signal to the third AC voltage signal and supply the third AC voltage signal to the condenser fan motor of the condenser fan motor assembly.

10. The drive circuit of claim 8, wherein:
the buck converter comprises
  a switch, and
  a driver configured to transition the switch between an open state and a closed state; and
a peak voltage of the DC voltage signal is based on an average voltage at an output of the switch.

11. The drive circuit of claim 8, wherein:
the buck converter comprises a switch and a driver; and
the driver is configured to reduce a DC voltage of the first DC voltage signal by adjusting a duty cycle of the switch.

12. The drive circuit of claim 8, wherein the condenser fan motor assembly is configured to convert the first DC voltage signal to the third AC voltage signal and supply the third AC voltage signal to the condenser fan motor.

13. The drive circuit of claim 8, wherein the condenser fan motor assembly is configured to pulse the first DC voltage signal and supply the pulsed first DC voltage signal to the condenser fan motor.

14. The drive circuit of claim 8, wherein the condenser fan motor assembly is configured to convert the first DC voltage signal to the second DC voltage signal and supply the pulsed version of the second DC voltage signal to the condenser fan motor.

15. A drive circuit comprising:
a rectification circuit configured to rectify a first alternating current (AC) voltage signal to generate a rectified voltage signal;
a buck converter configured to downconvert the rectified voltage signal to a first direct current (DC) voltage signal, wherein the first DC voltage signal is supplied to a DC bus;
a first inverter configured to convert the first DC voltage signal to a second AC voltage signal and supply the second AC voltage signal to a compressor motor;
a condenser fan motor assembly configured to receive the first DC voltage signal and one of
  convert the first DC voltage signal to a third AC voltage signal and supply the third AC voltage signal to a condenser fan motor,
  pulse the first DC voltage signal and supply the pulsed first DC voltage signal to the condenser fan motor, and
  convert the first DC voltage signal to a second DC voltage signal and supply a pulsed version of the second DC voltage signal to the condenser fan motor; and
a control module, wherein
  the buck converter comprises a switch and a driver,
  the driver is configured to receive a first control signal from the control module and control a state of the switch based on the first control signal,
  the condenser fan motor assembly comprises a controller,
  the controller is configured to receive a second control signal from the control module and adjust the third AC voltage signal based on the second control signal to adjust a speed of the condenser fan motor, and
  the control module is separate from the driver and the condenser fan motor assembly.

16. The drive circuit of claim 15, wherein the control module is configured to, based on at least one of a load or a commanded torque of the compressor motor, generate the first control signal and the second control signal.

* * * * *